(12) United States Patent
Lok et al.

(10) Patent No.: US 7,728,764 B2
(45) Date of Patent: Jun. 1, 2010

(54) SIDELOBE BLANKING CHARACTERIZER SYSTEM AND METHOD

(75) Inventors: Yuchoi F. Lok, Framingham, MA (US); Kaichiang Chang, Northborough, MA (US)

(73) Assignee: Raytheon Company, Waltham, MA (US)

( * ) Notice: Subject to any disclaimer, the term of this patent is extended or adjusted under 35 U.S.C. 154(b) by 270 days.

(21) Appl. No.: 11/975,478

(22) Filed: Oct. 19, 2007

(65) Prior Publication Data

US 2009/0102717 A1 Apr. 23, 2009

(51) Int. Cl.
G01S 13/00 (2006.01)
G01S 3/16 (2006.01)

(52) U.S. Cl. ........................ 342/159; 342/379

(58) Field of Classification Search .................... 342/13, 342/16, 17, 159–164, 379, 380
See application file for complete search history.

(56) References Cited

U.S. PATENT DOCUMENTS

| | | | | |
|---|---|---|---|---|
| 4,010,469 A * | 3/1977 | Marcum | ...................... | 342/16 |
| 4,143,372 A * | 3/1979 | Salvaudon et al. | ............ | 342/94 |
| 4,353,119 A * | 10/1982 | Daniel et al. | ................ | 702/194 |
| 4,367,472 A * | 1/1983 | Hauptmann et al. | ........... | 342/91 |
| 4,439,769 A * | 3/1984 | Masak | ........................ | 342/380 |
| 4,450,448 A * | 5/1984 | Albanese et al. | ............ | 342/379 |
| 4,554,548 A * | 11/1985 | Brilman et al. | ............... | 342/91 |
| 4,616,232 A * | 10/1986 | Reits | .......................... | 342/379 |
| 4,959,653 A * | 9/1990 | Ganz | ........................... | 342/17 |
| 5,307,069 A * | 4/1994 | Evans | .......................... | 342/19 |
| 5,600,326 A * | 2/1997 | Yu et al. | ...................... | 342/17 |
| 6,084,540 A * | 7/2000 | Yu | .............................. | 342/17 |
| 6,100,844 A * | 8/2000 | Whiting et al. | ............. | 342/379 |
| 6,377,212 B1 * | 4/2002 | Kinghorn et al. | ............ | 342/380 |
| 6,538,597 B1 * | 3/2003 | Steudel | ........................ | 342/17 |
| 6,650,271 B1 * | 11/2003 | Simone et al. | ................ | 342/16 |
| 6,768,444 B2 * | 7/2004 | Langsford | .................... | 342/17 |
| 2004/0027268 A1 * | 2/2004 | Langsford | .................... | 342/16 |
| 2009/0102717 A1 * | 4/2009 | Lok et al. | ................... | 342/379 |

OTHER PUBLICATIONS

Maisel, Louis, "Performance of Sidelobe Blanking Systems", IEEE Transactions on Aerospace, Mar. 1968, vol. AES-4, No. 5.

Farina, Alfonso, et al., "Calculation of Blanking Probability for the Sidelobe Blanking for Two Interference Statistical Models", IEEE Signal Processing Letters, Apr. 1988, vol. 5, No. 4.

(Continued)

*Primary Examiner*—Thomas H Tarcza
*Assistant Examiner*—Peter M Bythrow
(74) *Attorney, Agent, or Firm*—Baker Botts L.L.P.

(57) ABSTRACT

According to a particular embodiment, a method for evaluating different antenna designs includes receiving different sets of antenna patterns representative of the different antenna designs from a corresponding number of data sources. The different sets of antenna patterns are applied to a characterizer component for generating a sidelobe banking (SLB) characteristic map for each set of antenna patterns received. A SLB effectiveness chart is generated from the SLB characteristic map. A best antenna weighting set is selected based on which auxiliary antenna pattern exhibits the best performance. The best of antenna weighting factors are used for designating the antenna design having superior SLB performance characteristics.

21 Claims, 21 Drawing Sheets

OTHER PUBLICATIONS

Farina, Alfonso, et al., "Interference Blanking Probabilities for SLB in Correlated Gaussian Clutter Plus Noise", IEEE Transactions on Signal Processing, May 2000, vol. 48, No. 5, p. 1481.

Farina, Alfonso, et al., "Design of SLB Systems in the Presence of Correlated Ground Clutter", IEEE Proc.-Radar, Sonar Navigation, Aug. 2000, vol. 147, No. 4.

Farina, Alfonso, et al., "Systolic Schemes for Joint SLB, SLC and Adaptive Phased-Array", IEEE International Radar Conference, 2000.

Rudge, A.W., et al., "The Handbook of Antenna Designs", IEEE Electromagnetic Waves Series, p. 737-749.

Shnidman, David A., et al., "Sidelobe Blanking with Integration and Target Fluctuation", IEEE Transactions on Aerospace and Electronic Systems, Jul. 2002, vol. 38, No. 3.

PCT Search Report and Notification of Transmittal of The International Search Report and The Written Opinion of the International Searching Authority, or the Declaration, 8 pages, Jan. 9, 2009.

* cited by examiner

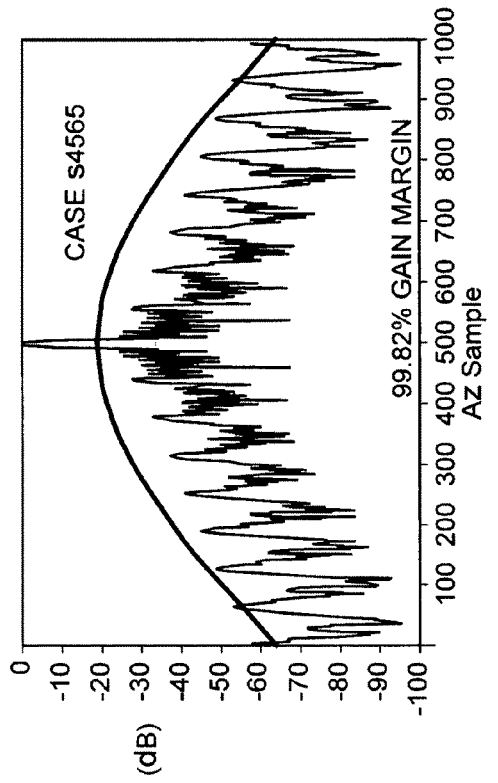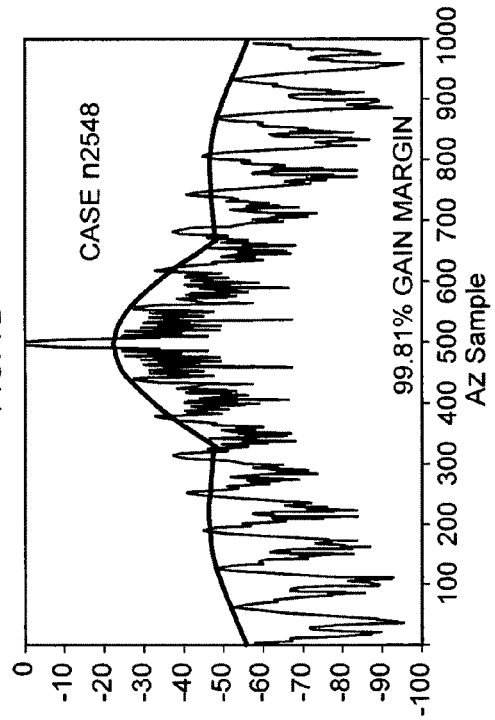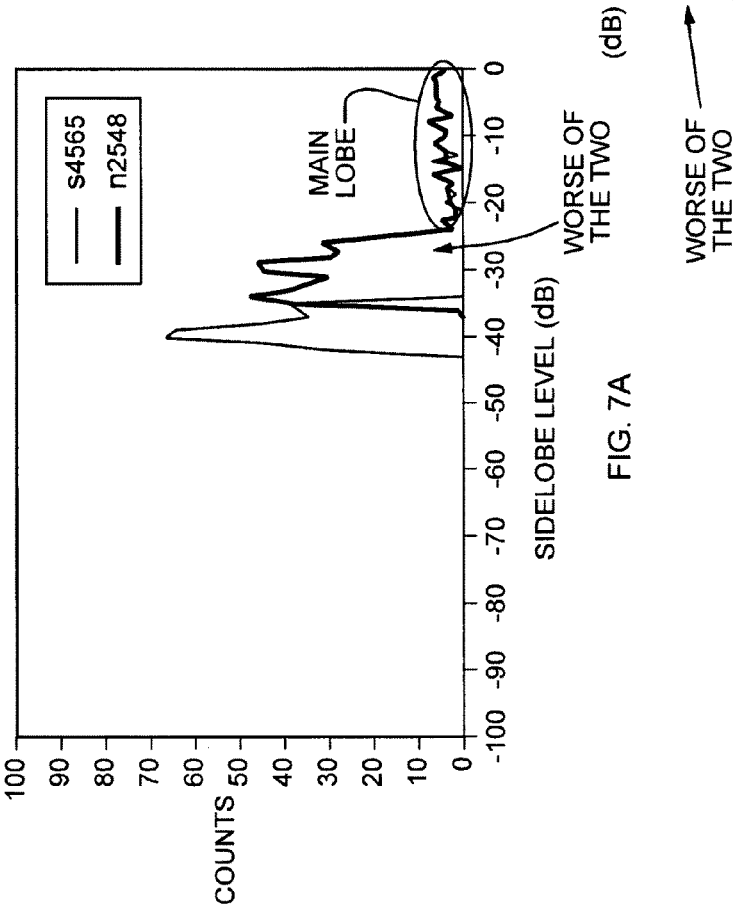

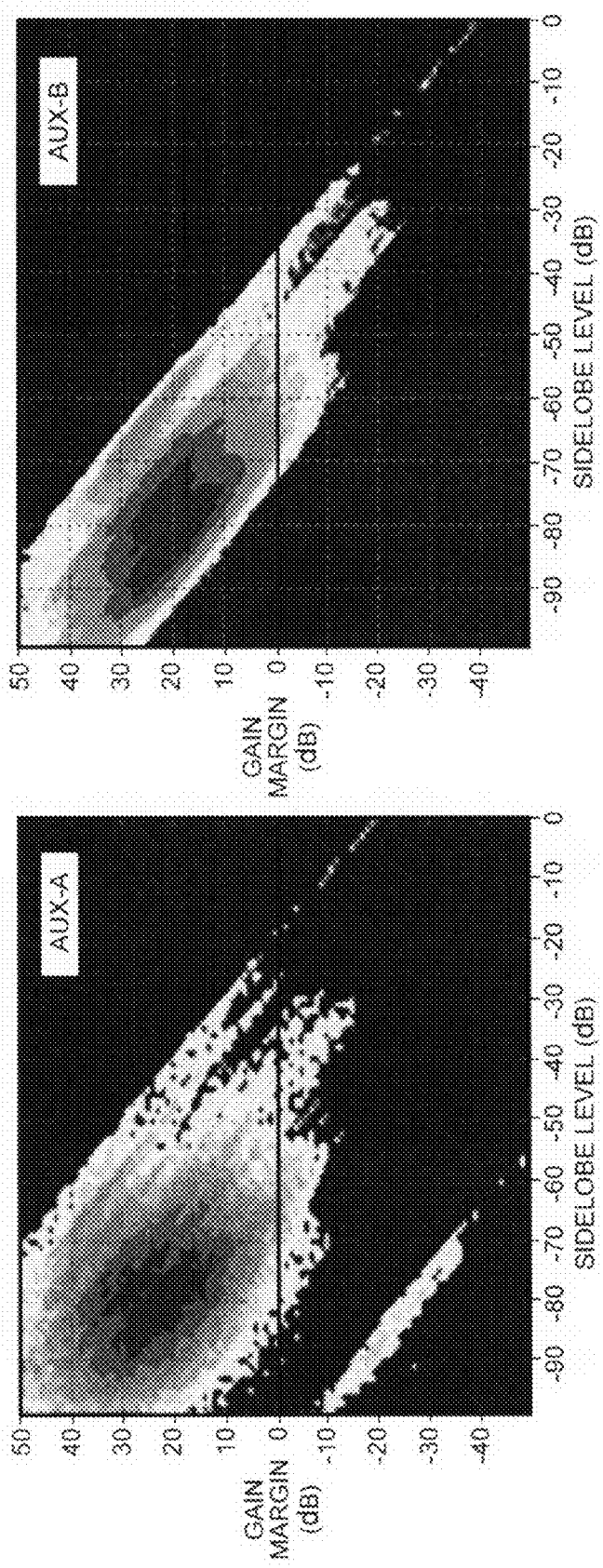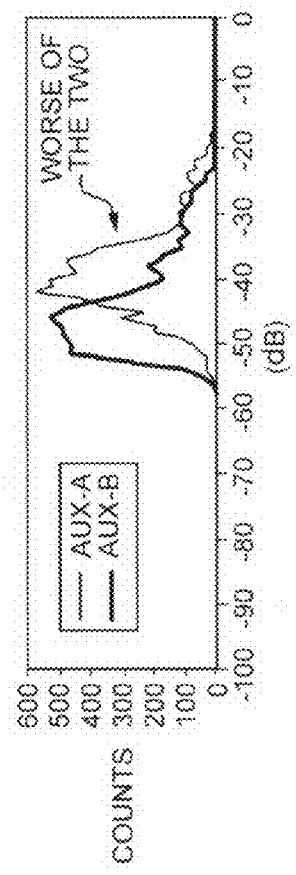
FIG. 7E
FIG. 7D
FIG. 7F

SIDELOBE BLANKING CHARACTERIZER SYSTEM AND METHOD

GOVERNMENT INTEREST

This invention was made with government support under Contract No. N00024-04-C-5340 awarded by The Department of the Navy. The government has certain rights in the invention.

BACKGROUND OF THE INVENTION

1. Field of the Invention

This invention relates generally to antenna system design and more particularly to radar systems that utilize sidelobe blanking (SLB) for suppressing interference signals.

2. Description of Related Art

In many radar applications, stray signals may enter the radar through the sidelobes of the main antenna and may be interpreted as main beam signals. This results in false detections and angle error. Sidelobe blanking (SLB) has been commonly used to suppress such signals when they are impulsive (low duty cycle) whether they are due to sidelobe jammers, strong targets or discrete clutter echoes. The principle of SLB is to inhibit detection when such signals appear in the radar sidelobes.

In his 1968 paper entitled "Performance of Sidelobe Blanking Systems", Maisel (Pub. Info) introduced what has come to be regarded as the classic SLB architecture. Maisel was concerned with the case where detection was based on a single radar pulse from a target with a constant radar cross section (RCS) and defined expressions for some of the relevant performance probabilities for evaluating SLB characteristics. These include Probabilities of Blanking (Pb), Probabilities of False Alarm (Pfa) and Probabilities of Detection (Pd). Farina and Shnidman have extended Marisel's work to include some expressions for certain types of target fluctuations.

The classic SLB architecture defined by Maisel has two antennas and associated receiver channels (i.e. main and auxiliary channels). The main antenna exhibits a relatively narrow main beam to interrogate its field of view and receive corresponding echo radiation therefrom. The auxiliary antenna, implemented as a single omni-directional element to the antenna system, exhibits a much broader main beam having less gain compared to the narrow main beam to receive the echo radiation. The auxiliary antenna gain is designed to be higher than the maximum sidelobe level of the main channel antenna pattern. The SLB logic circuits compare the signals processed by the two channels and determine whether or not to blank the main radar channel (i.e. decides that the echoes come from the sidelobes and blanks the echo). When the main channel output is larger than a suitable blanking threshold level, that is based on the auxiliary channel output, the main channel signal is processed as usual (i.e. it is submitted to the conventional circuits of the radar to ascertain whether a target is present in the searched direction). If this is not the case, then the main channel signal is inhibited or blanked (i.e. decided that the echoes come from the sidelobes and the echo is blanked).

As illustrated in FIG. 4A, the main goal of the SLB design is to select the parameter gain margin $\beta$, which is the difference (in dB) between the sidelobes $\delta$ of the main antenna and the auxiliary antenna gain $\omega$. The numerical calculations of the Pb, Pfa and Pd parameters are necessary to select the proper values of F, $\omega$, $\beta$ and consequently of the auxiliary antenna gain $\omega$, given the maximum sidelobe level $G\omega$. These calculations are described in the article entitled "Design of SLB systems in the presence of correlated ground clutter" by A. Farina and F. Gini published in IEE Proceedings—Radar, Sonar Navigation, Vol. 147 No. August 2000. The use of Pb, Pd and Pfa rely on many system parameters including SLB gain margin, detection threshold, SLB threshold, target signal to noise ratio, interference to noise ratio (including jammer and clutter) and SLB configuration (before and after detection). One problem with this approach is that it is difficult to make comparison with multiple variables. Thus, the results do not reflect the performance of SLB antennas but instead are controlled by the system parameters. Further, the number of described approaches that compare the probabilities of blanking illustrate that there are too many parameters to manage.

Another approach involves comparing the cumulative percentage of gain margin. In this case as illustrated in FIG. 3, the method involves comparing the cumulative percentage of gain margin defined as the gain difference between the auxiliary and main antennas at corresponding angular positions as denoted by the shaded area in FIG. 3. The diagram also illustrates a typical distribution of the gain margin in a bell shaped curve. As shown, the cumulative percentage is usually reversed (one minus the percentage). The disadvantage is that this method relies on a single point comparison which is inaccurate.

The above prior art approach is further illustrated as follows. FIGS. 4B, 4C and 4D illustrate an example of a set of antenna patterns corresponding to a main beam pattern and auxiliary A and B sidelobe patterns. FIG. 4E illustrates a v-plane cut of the antenna patterns, the auxiliary B pattern appears low because the v-plane cut is on its null. FIG. 4F illustrates cumulative percentage at 0 gain margin. That is, the results of the second approach of computing cumulative percentage of the gain margin of the auxiliary A and auxiliary B sidelobe patterns. Comparing the cumulative percentage of gain shows the auxiliary A sidelobe pattern having a higher cumulative percentage at gain margin values>0 while the auxiliary B sidelobe pattern has higher cumulative percentage at gain margins<0. Thus, from this, utilizing the single gain point of 0, it is difficult to tell which antenna will perform better.

In addition to the above, the SLB systems discussed above are usually fixed during their design and hence they are not adaptive during real time operations. That is, SLB is effective at identifying interference from pulsed interference sources in the sidelobe directions. Thus, when there are platform motion or element or sub-array failures, SLB becomes less effective at identifying interference.

Accordingly, it is an object to provide a method of providing an effective SLB capability for inclusion in an antenna design.

It is another object of the present invention to provide a method of providing effective SLB during real time operation.

SUMMARY OF THE INVENTION

The above and other objects are achieved according to an illustrated embodiment of the method and system of the present invention which includes a SLB component for improving the effectiveness of sidelobe blanking operations through the combining of multiple dimension data into a single figure of merit comparison. In the illustrated embodiment of a radar system, the SLB component corresponds to a sidelobe blanking characterizer component positioned between a radar data processor and beam steering generator of the radar system. The radar data processor provides several sets of antenna patterns which are used by the characterizer component to compute gain margins according to the teachings of the present invention which takes into account, main beam sidelobe distribution.

From the computed gain margins, the characterizer component generates SLB characteristic maps which are used to evaluate SLB performance. The use of a SLB characteristic map provides a much less complex method for evaluating antenna design independent of other system parameters which were discussed previously. Based on such SLB characteristic maps, the characterizer component generates SLB effectiveness charts which it uses to compare SLB performance and determine which set of main and auxiliary antenna patterns has the best performance. The set of antenna patterns having the best performance determines the best set of weighting factors (e.g. an index associated with the set of antenna patterns is used to lookup the best set of weighting factors). That is, it is the set of weighting factors to be used to generate the set of antenna patterns that is selected according to its performance. The weighting factors can be either computed in real-time or pre-computed in advance in a conventional manner for the different sets of antenna patterns whose gain margins were computed by the characterizer component.

During real time operation of the radar system of the illustrated embodiment, the characterizer component is used to select the set of best weighting factors corresponding to the set of antenna patterns provided by the main and auxiliary antenna elements determined to have the best performance. The best set of weighting factors are then used for adapting the operation of the radar system to changes in conditions such as platform motion for shipboard applications and antenna element failures. More specifically, the weighting factors of the best set are sent to the auxiliary antenna phase array elements and to the beam steering generator for controlling the direction of the main beam of the main antenna (i.e. for steering the main beam) to produce the desired antenna pattern result which compensates for antenna element or sub-array failures and platform motion during real time operations. It will be noted that the antenna elements do not change but the weighting factors controlling the elements cause the generation of the desired antenna pattern result. Providing optimum SLB performance becomes particularly important where the number of antenna elements within an antenna system is not very large (e.g. small antenna systems). In such cases, antenna element failures can seriously impact SLB performance.

The method and apparatus of characterizer component of the present invention are also equally usable as an antenna design tool wherein the selection of the set of best antenna patterns can be used in determining the best design approach. In this case, sets of antenna patterns are applied as inputs to the characterizer component which represent the different antenna design approaches which are to be compared.

Additional objects, features and advantages of the invention will become apparent to those skilled in the art upon consideration of the following detailed description of the illustrated embodiment exemplifying the best mode of carrying out the invention as presently perceived.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and which includes the following.

FIGS. 7A, 7B and 7C illustrate the comparison of the SLB effectiveness charts and the corresponding antenna patterns.

FIGS. 7D and 7E illustrate another example of Characteristic Maps of AUX-A and AUX-B antenna patterns.

FIG. 7F illustrates the SLB Effectiveness Chart of the antenna patterns of FIGS. 7D and 7E.

DESCRIPTION OF ILLUSTRATIVE EMBODIMENT

Figure 1:
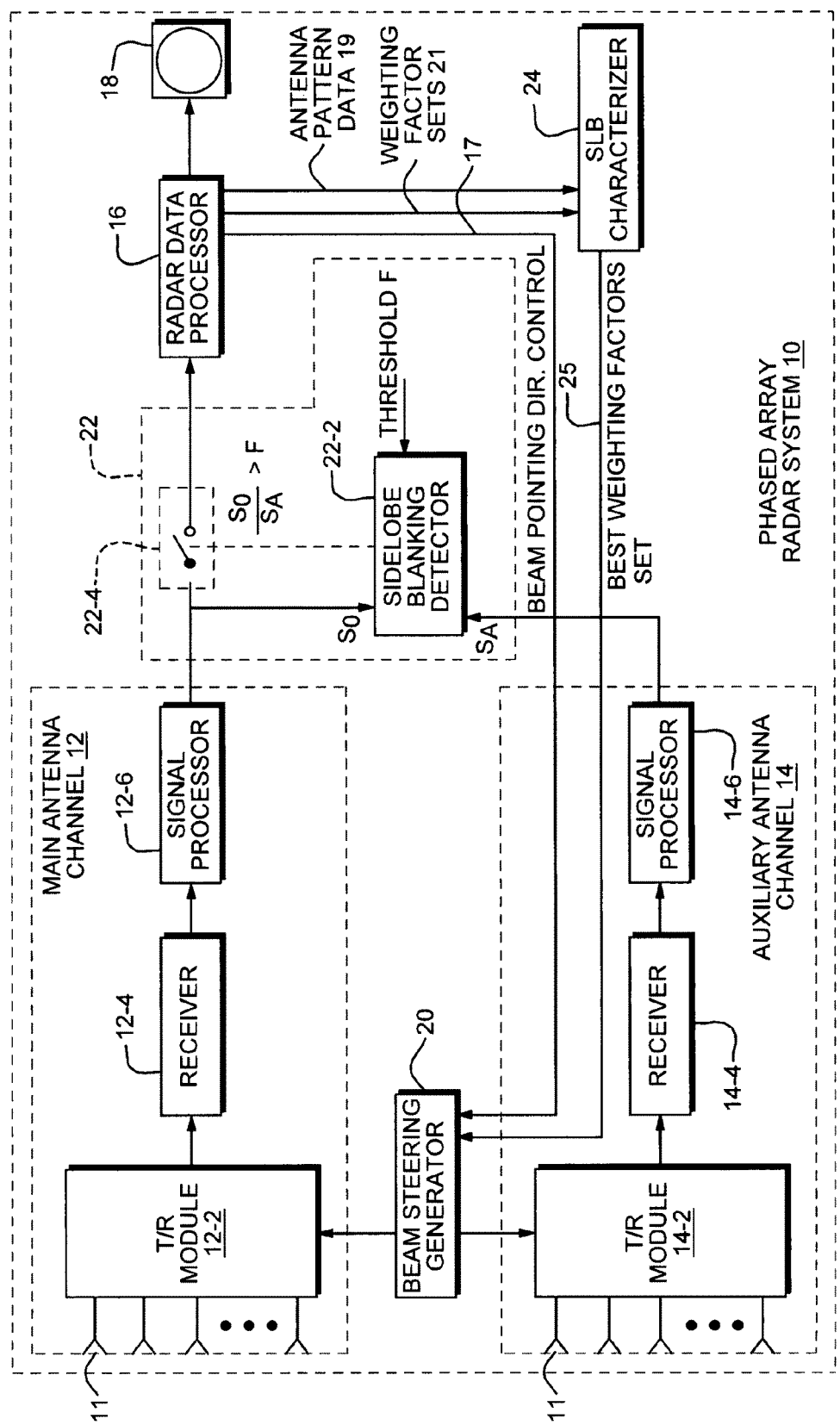
FIG. 1 is a block diagram of the illustrated embodiment which incorporates the method and SLB system of the present invention.

Referring to FIG. 1, there is shown an illustrative embodiment of the present invention which comprises a phased array radar system 10 incorporating the method and SLB system of the present invention. As shown, system 10 includes a plurality of conventional components that are generally found in a phased array radar system. These components include main and auxiliary antenna channels 12 and 14 respectively, a radar data processor 16 coupled to a display unit 18 and a beam steering generator 20 arranged as shown.

The system 10 also includes a SLB detector circuit 22 which can also be considered conventional in design and is described in the previously cited articles. According to the teachings of the present invention, the system 10 further includes a SLB characterizer 24 component. The SLB characterizer 24 component is coupled or connected between radar data processor 16 and beam steering generator 30 as shown.

The components of FIG. 1 will now be described in greater detail. Each of the main and auxiliary antenna channels 12 and 14 receive radar antenna input signals from the main and auxiliary antenna elements 11 respectively of a phased array antenna system (not shown). As well known in the art, the phased array antenna system is implemented with a large number of antenna radiating elements which are individually excited. Each radiating element is fed by a transmit/receive (T/R) module represented by blocks 12-2 and 14-2 in FIG. 1. Each T/R module includes post and preamplifiers, attenuators and phase shifters.

In the transmit mode, the radar data processor 16 supplies beam pointing direction signals 17 to beam steering generator 20. Beam steering is provided by generator 20 which is carried out by the main antenna 12-2 only. The T/R modules delay the excitation of selected radiating elements. For this type of antenna, adequate delays can be supplied by adjusting the phase of the excitation signals applied by the antenna T/R modules 12-2 to the radiating elements; hence the term "phased array antennas" is used. The T/R module phase shifters are used for controlling the phase, and the attenuators (e.g. digitally controlled) are used for controlling the amplitude.

In the receive mode, the outputs of the T/R modules 12-2 and 14-2 of antenna channels 12 and 14 respectively are applied to receivers 12-4 and 14-4 whose outputs are fed to signal processors 12-6/14-6. Each signal processor 12-6/14-6 applies the signals to the SLB detector 22 whose output is applied to radar data processor 16. In the illustrated embodiment, the main and auxiliary channels 12 and 14 are implemented with the same components.

The auxiliary antenna of the antenna system is omni directional and has gains higher than that of any of the radar antenna sidelobes. Such arrangements are discussed in the article entitled "Systolic Schemes for Joint SLB, SLC, and Adaptive Phased-Array" by A. Farina, L. Timmoneri Alema Marconi Systems published in the 2000 IEEE International Radar Conference. It is well known in the art that the number and arrangement of antenna elements may be selected to suit the requirements of the system and that the number dictates the number of lobes which are generated and the width of the main beam.

Still referring to FIG. 1, as described in the above referenced Farina articles, the SLB detector 22 circuit, conventional in design, includes a sidelobe blanking circuit 22-2 which controls a switch gate circuit 22-4. The SLB detector circuit 22-2 receives output sidelobe pattern signals SA from the auxiliary antenna channel, 14 and main beam sidelobe output pattern signals S0 in addition to a blanking threshold F that is a system design parameter. The circuit 22-2 compares the sidelobe output pattern signals S0 to SA. Only the output signals of the main channel are passed through the gate circuit 22-4 to radar data processor 16 that are stronger than the output sidelobe signals of the auxiliary channels by the amount of the blanking threshold F in dB.

The radar data processor 16 in response to antenna status report information, such as element/sub-array failure or platform motion, provides sets of antenna pattern data 19 as inputs to the SLB characterizer 24 component. For the purpose of the illustrated embodiment, the report information is generated in a well known manner and therefore, is not discussed further herein. The SLB characterizer 24 component could be implemented and included inside the radar data processor, in the beam steering generator 20, or in a separate processor component as described herein. Additionally, radar data processor 16 also provides appropriate weighting factor sets 21 for the sets of antenna pattern data 19. Further, the radar data processor 16 includes a direction control unit which produces beam pointing direction signals applied as inputs to the beam steering generator 20 for establishing the beam pointing direction of the main beam received from the main antenna channel 12. The weighting factor sets are generated in a conventional manner to compensate for the failed elements/sub-array or platform motion. The process of computing weighting coefficients is described in section 9.1.2 of the text entitled "The Handbook of Antenna Design", by A. W. Rudge, K. Milne, A. D. Oliver and P. Knight, IEE Electromagnetic Wave Series, published by Peter Peregrinus Ltd., London UK, Copyright 1982-1983. The computed weighting coefficients could be generated off-line for sets of sample antenna patterns and stored within the radar data processor 16.

As discussed above, the SLB characterizer 24 component can be implemented in any radar system to characterize its SLB capability by evaluating its antenna patterns as a function of the different modes of radar system operation. In an antenna system, an antenna pattern is a far-field spatial response which is obtained by calculating the Fast Fourier Transform of its antenna excitations (i.e. weighting factors). Using known antenna pattern synthesis techniques, these antenna excitations are pre-determined to ensure that they meet the antenna specifications of sidelobe levels and aperture efficiency which are derived for satisfying requirements for radar system compliance.

In summary, the antenna pattern is obtained by calculating the Fast Fourier Transform of the weighting factors as a function of the radar antenna system's operational mode and scan angles. Next, the weighting factors are selected by using various pattern synthesis techniques so as to meet the antenna sidelobe and aperture efficiency requirements which are defined by radar system engineers for meeting different radar system requirements driven by various threat scenarios.

Figure 17:
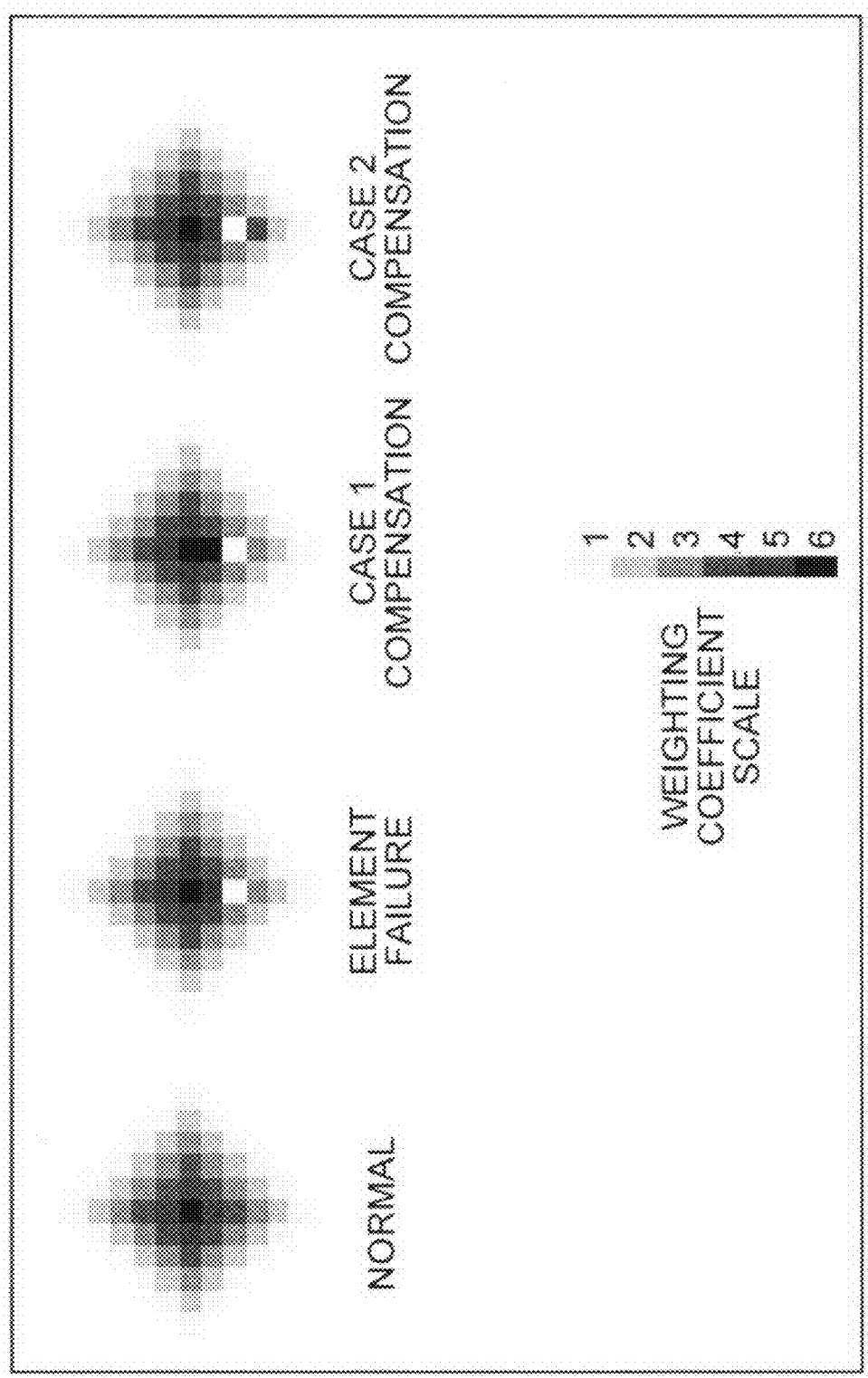
FIG. 17 illustrates an example of adjusting weighting coefficients after an element/sub-array failure.

An example of the above radar processor operation in responding to antenna status report information pertaining to element/sub-array failure will now be described with reference to FIG. 17. Referring to FIG. 17, an example is shown of adjusting the weighting coefficients after element/sub-array failure. The group of gray colored squares on the left most side represent the weighting coefficients for an antenna in a normal condition. The second group of squares on the left shows a white square which represents a failed element or sub-array. This element is supposed to carry a coefficient of 4, but now is 0. One of the methods used to compensate for this failure is to shift its coefficients to the neighboring element. There are 8 immediate neighboring elements but to maintain symmetry, they can only be the one above and the one below the failed element. The second right group shows that the weighting above the failed element is increased from 5 to 6. The right most group shows that the weighting below the failed element is increased from 3 to 4. To determine which of the two methods of compensations is a better solution, the SLB characterizer 24 component takes the antenna patterns generated from these sets of weighting coefficients to produce comparison result as described later herein.

Figure 2:
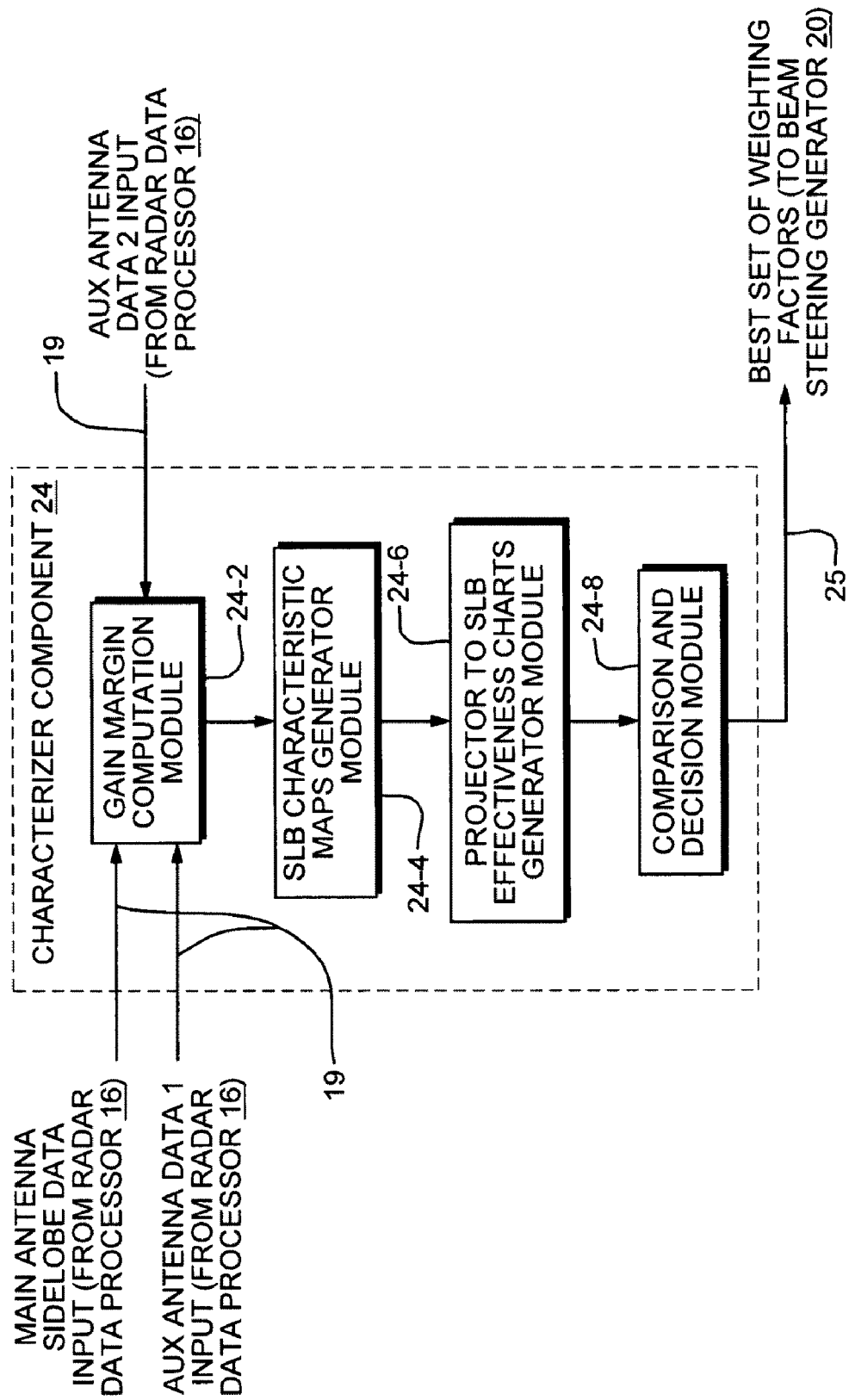
FIG. 2 is a block diagram of the characterizer component of the illustrated embodiment of FIG. 1.
Figure 3:
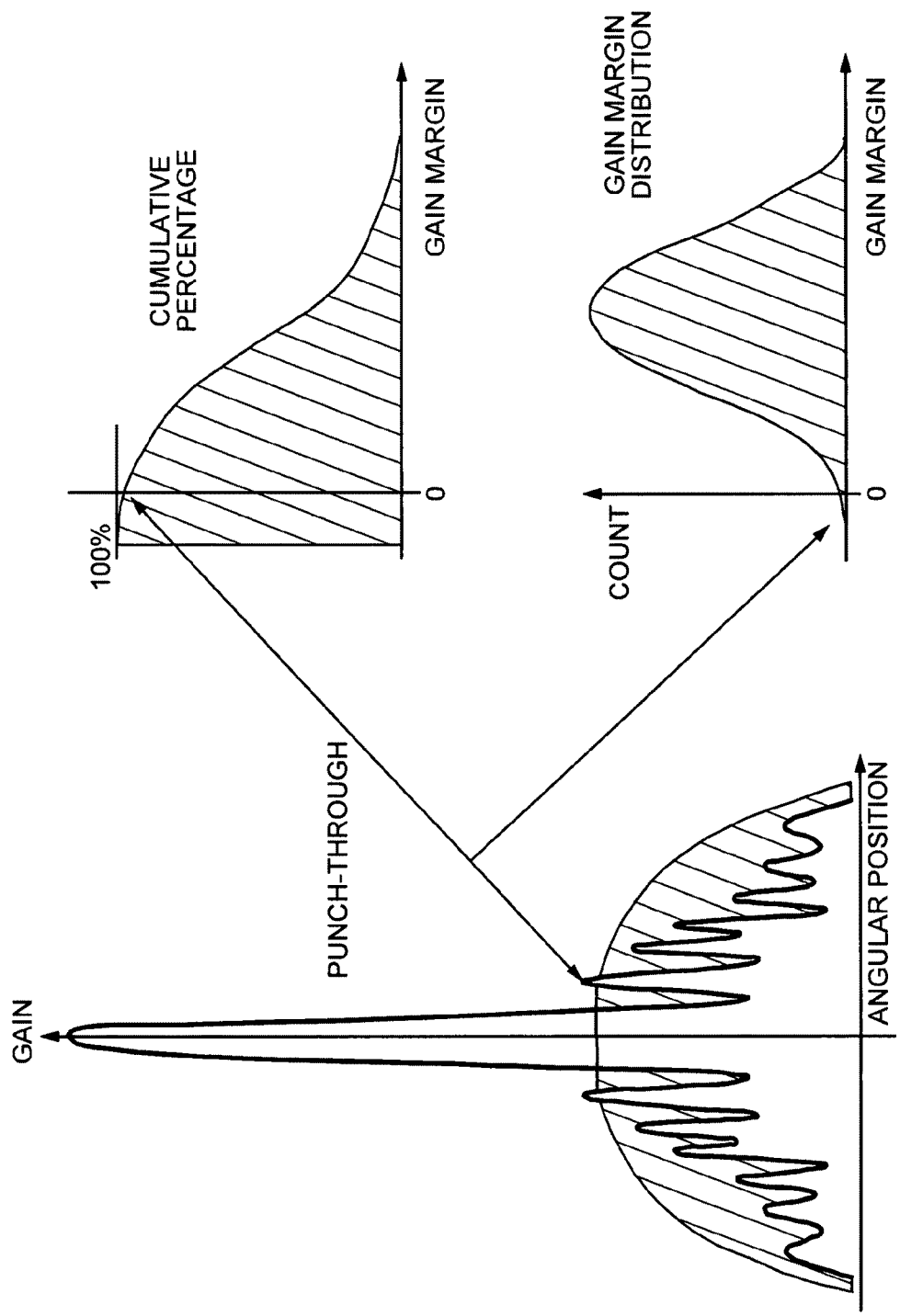
FIG. 3 are charts used in describing a prior art approach which utilizes cumulative percentage of gain margin in determining performance.
Figure 4A:
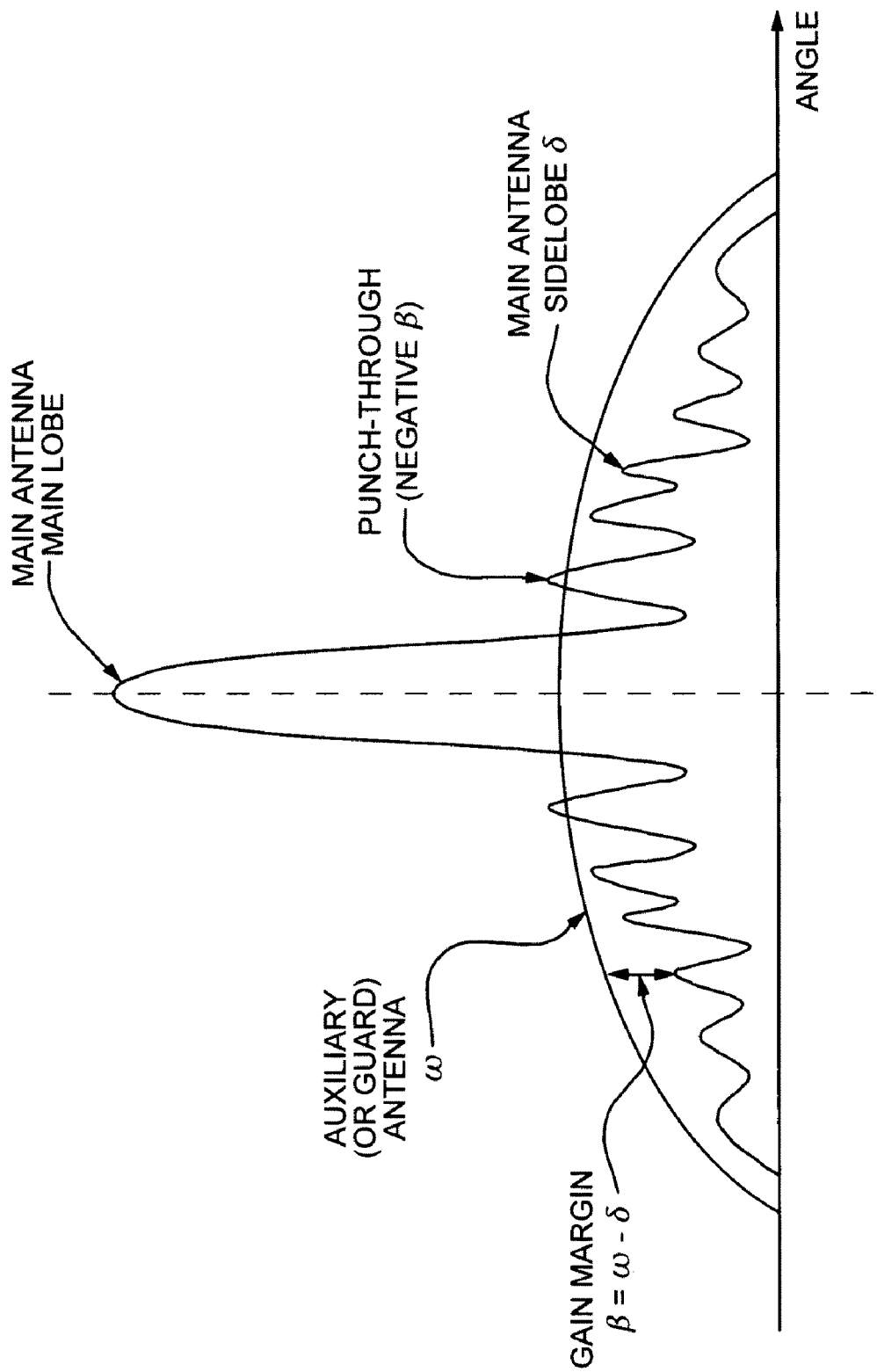
FIG. 4A illustrates antenna patterns used in describing SLB design parameters.
Figure 4B:
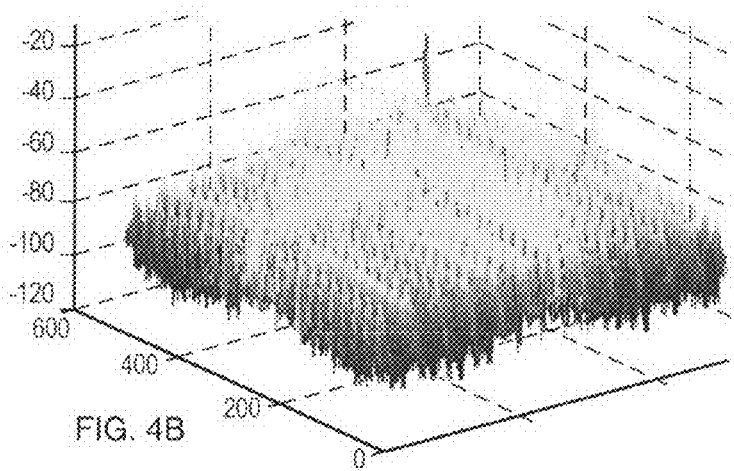
FIGS. 4B, 4C and 4D illustrate an example of antenna patterns used in describing the prior art approach of FIG. 3.
Figure 4C:
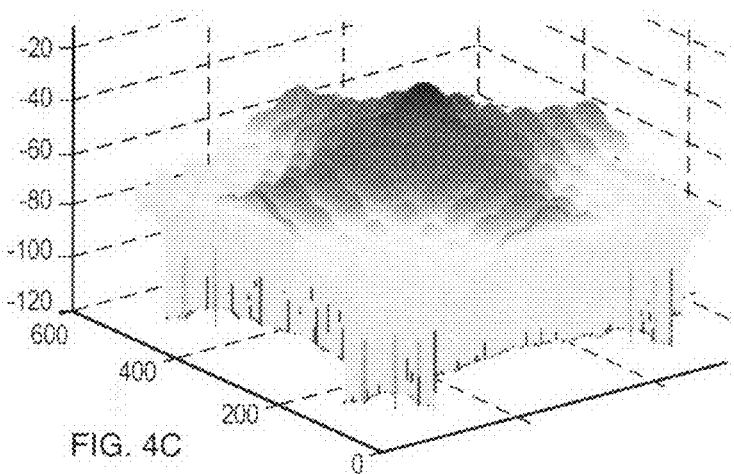
Figure 4D:
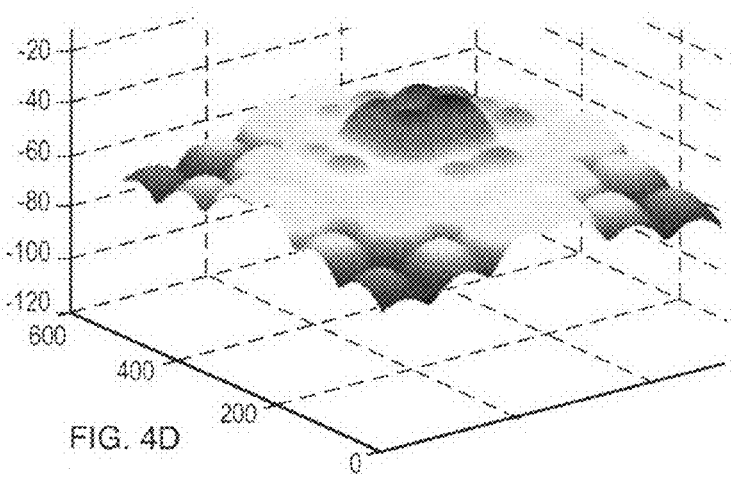
Figure 4E:
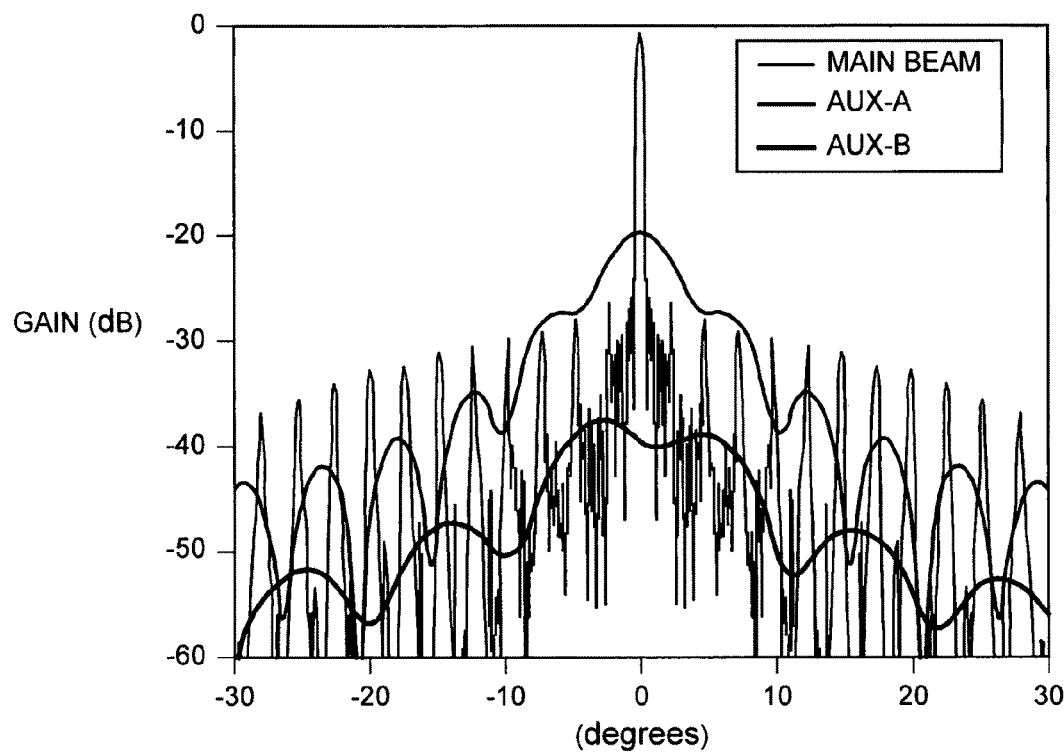
FIG. 4E used in describing the prior art approach of FIG. 3 illustrates the v-plane cut of the antenna patterns of a main beam and Auxiliary A and Auxiliary B antenna patterns.
Figure 4F:
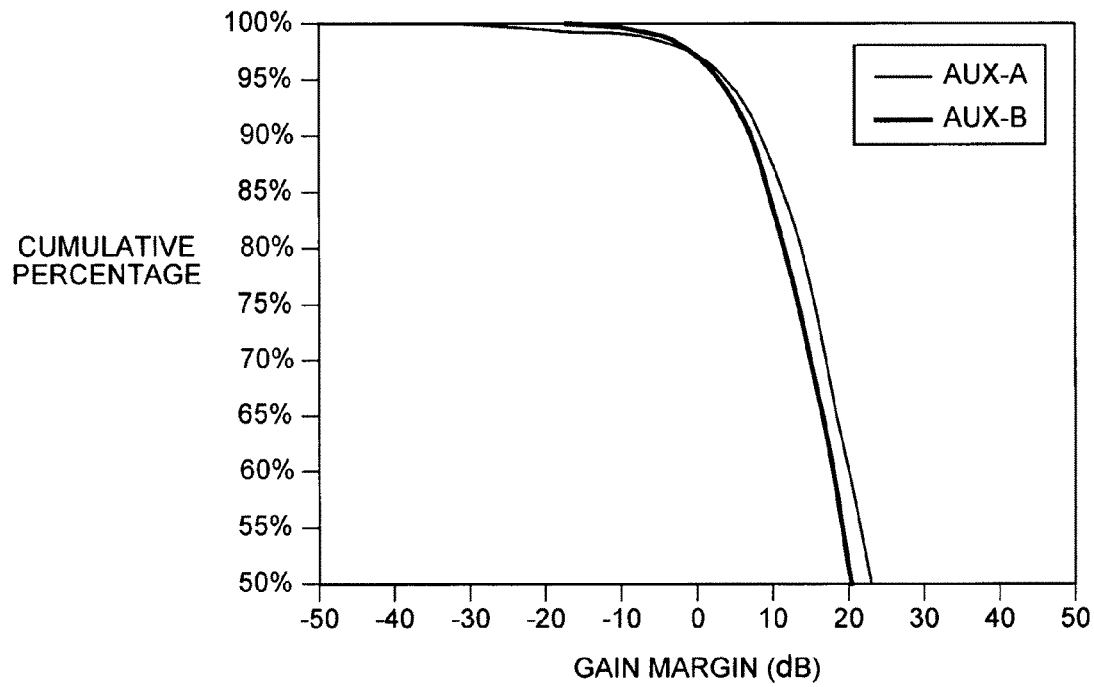
FIG. 4F also used in describing the prior art approach of FIG. 3 is a graph showing cumulative percentage of gain margins from AUX-B and AUX-B antenna patterns.

Referring to FIG. 2, the SLB characterizer 24 component will now be described in greater detail. As shown, component 24 includes a plurality of modules 24-2 through 24-8. The module 24-2 computes gain margin for each set of antenna patterns generated by radar data processor 16 applied to main antenna sidelobe data input and auxiliary antenna data 1 and data 2 inputs obtained from the data processor 16. The radar data processor 16 computes several sets of antenna patterns 19 using different weighting factors 21 according to the current outage of antenna components and platform motion included in the status report information discussed above. As indicated above, this information is produced in a conventional manner known to one skilled in the art.

The outputs from module 24-2 are applied to the SLB characteristic map generator module 24-4 which generates SLB characteristic maps according to the teachings of the present invention. The map outputs are applied to the effectiveness charts generator module 24-6 which produces the effectiveness charts from the SLB characteristic maps by an oblique projection method/technique of the present invention described herein relative to FIG. 6. The resulting effectiveness charts are applied to the comparison and decision module 24-8 which selects the best set of antenna patterns based on the results in the effectiveness charts according to the teachings of the present invention.

Figure 8:
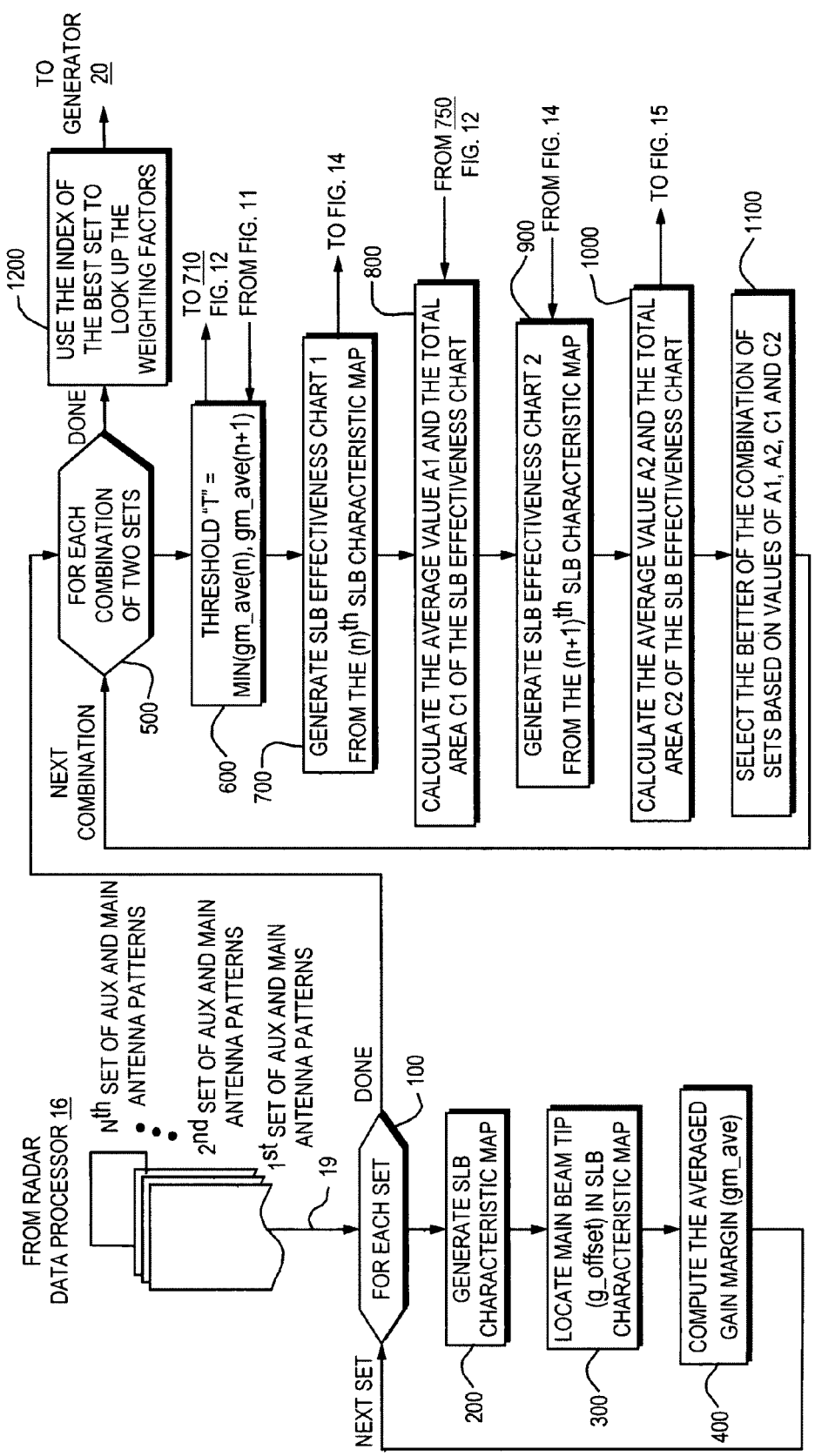
FIG. 8 is a flowchart used in describing the process and system of the present invention.

Referring to FIGS. 8 through 15, it will be appreciated that the modules of the characterizer 24 component may be implemented by software modules which perform the functions and operations illustrated in FIGS. 8 through 15. The modules will now be described in greater detail with reference to those figures. FIG. 8 illustrates the overall operation or process of the characterizer 24 component in selecting the best set of auxiliary and main antenna patterns from the sets of antenna patterns applied to the inputs of gain margin computation module 24-2.

The SLB Characterizer 24 component operation is based on SLB gain margin and the sidelobe distribution of the main antenna. The methodology according to the teachings of the present invention is to compare SLB gain margin at the corresponding main antenna sidelobe level positions. The concept is that assuming two SLB antennas with the same SLB gain margins, the one at the lower sidelobe of the main beam is always better because the lower antenna gain results in lower probability of false alarm detection (Pfa).

Figure 5:
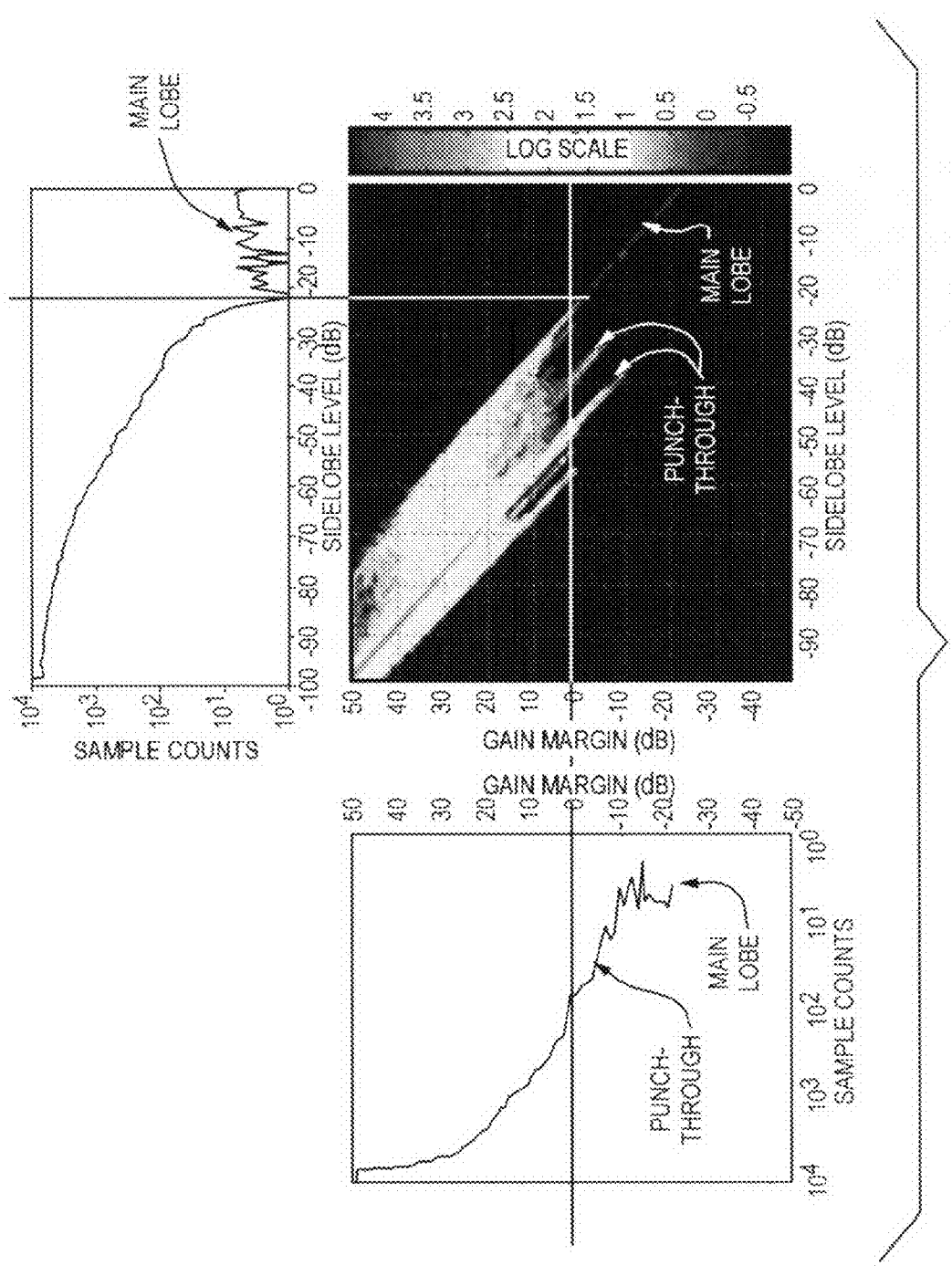
FIG. 5 illustrates an SLB characteristic map which is generated from the flow diagram of FIG. 9.
Figure 6:
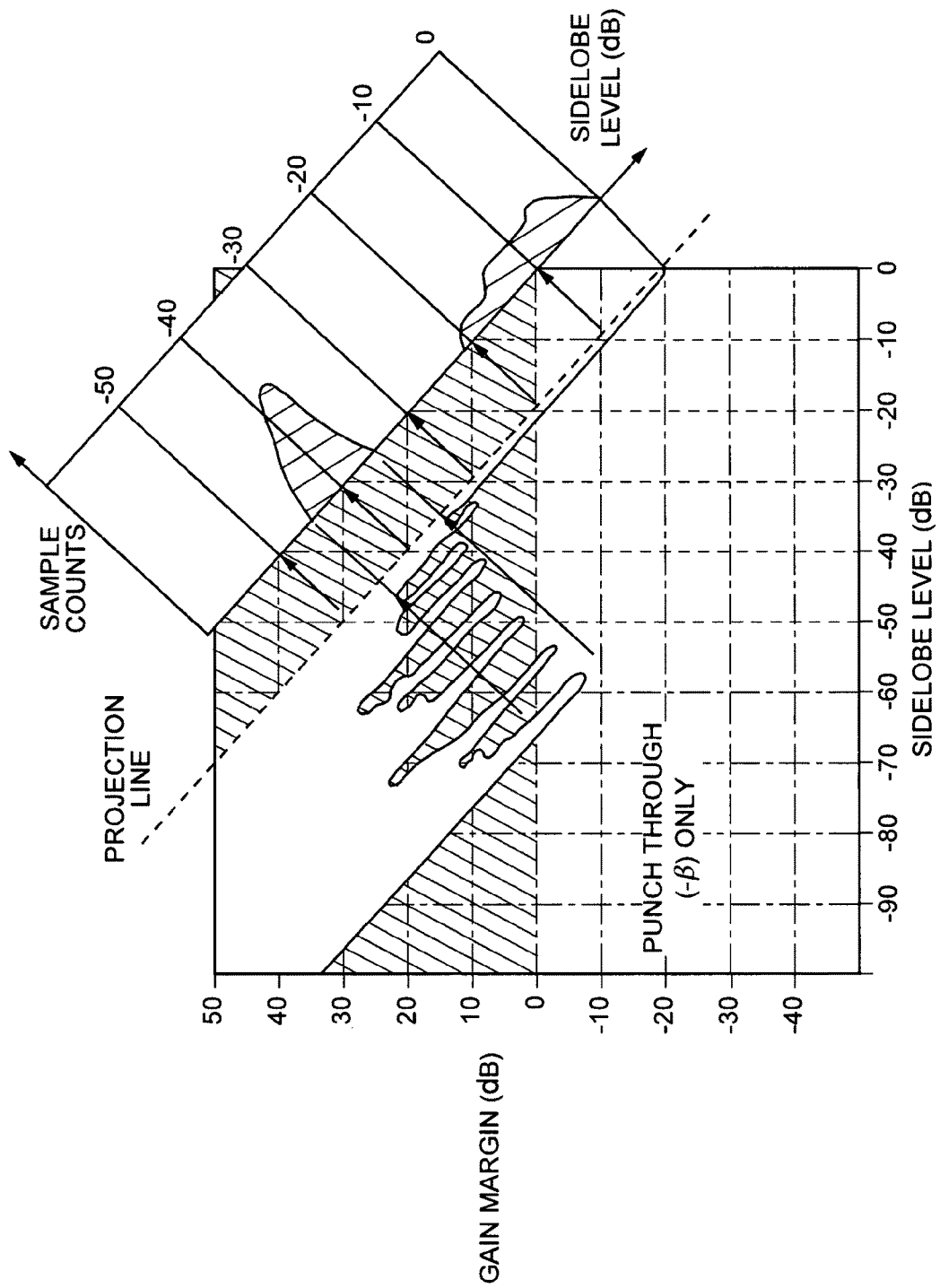
FIG. 6 illustrates an SLB effectiveness chart projected from the SLB Characteristic Map.

Referring to FIG. 5 and FIG. 6, the methodology can be divided into two broad steps. The first step is to generate a SLB Characteristic Map such as the one in FIG. 5. In that figure, the SLB characteristic map in the lower right corner shows gain margin distribution on the vertical axis and the main beam sidelobe distribution on the horizontal axis. The charts on the top and the left side are the distribution charts of the corresponding axis showing the cumulative distribution of sidelobe level and the cumulative distribution of gain margin. The second step is to generate the SLB Effectiveness Chart from the SLB Characteristic Map using the oblique projection technique/method. As stated, this technique is illustrated in FIG. 6. It will be described in greater detail with reference to FIGS. 12 and 13.

Referring to FIG. 1, FIG. 7A and FIG. 7B, when multiple SLB Effectiveness Charts are overlaid on the same axis by the SLB Characterizer 24 component, the best antenna weighting factors set 25 is selected with the lowest distribution or distribution at the lowest sidelobe. Examples of the ease of making such selections utilizing the teachings of the present invention are illustrated in FIGS. 7A and 7B and in FIGS. 7D through 7F.

The example in FIG. 7A uses two auxiliary antenna patterns designated as case s4565 and case n2548 of FIGS. 7B and 7C respectively. Both auxiliary antenna patterns have similar cumulative percentage (99.8%) of Gain Margin>0 dB. Therefore, selecting the set having the best performance would be most difficult. However, it is obvious that the negative Gain Margin region of case s4565 is at the lower sidelobe level than the case n2548. That means case s4565 is less sensitive to interference which it may not be able to blank out. The SLB Effectiveness Chart in FIG. 7A shows the average sidelobe level of case n2548 is higher than case s4565. By considering the average sidelobe level on the SLB Effectiveness Chart, the decision of selecting case s4565 now becomes straight forward. FIGS. 7D and 7E show another example of using AUX-A and AUX-B antenna patterns. Again, the SLB Effectiveness Chart of FIG. 7F shows the average sidelobe level of pattern AUX-A is higher than pattern AUX-B. Thus, it is easily seen that pattern AUX-B is a better choice of the two auxiliary antenna patterns.

Figure 9:
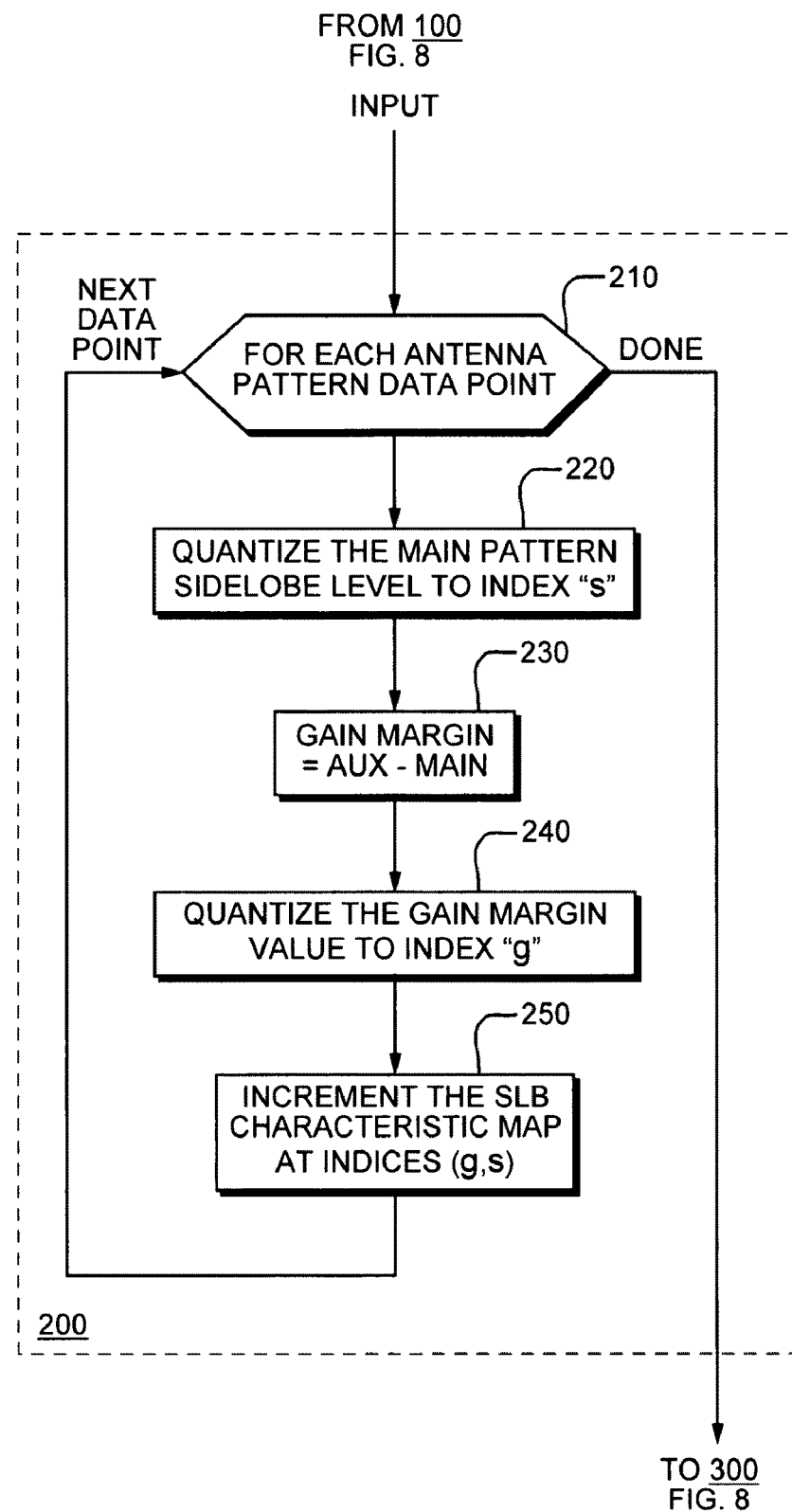
FIGS. 9, 11, 12, 14 and 15 illustrate in greater detail, the operations of blocks 200, 500, 700, 800, and 1100 respectively of the flowchart of FIG. 8.

Referring now to FIG. 8, and FIG. 9, FIG. 8 illustrates a flow chart of the process algorithm of selecting the best antenna pattern and weighting factor sets based on which antenna pattern set has the best performance according to the teachings of the present invention. The flowchart includes blocks or modules 100 through 1200, and it is assumed that at least two sets of antenna patterns are available for the selection. As indicated by blocks 100 and 200 in FIG. 8, the characterizer 24 component performs a process which starts by generating a SLB Characteristic Map 200 for each set of antenna patterns 100. FIG. 9 illustrates in greater detail, the steps performed by module 24-4 of FIG. 2 in generating an SLB Characteristic Map.

Figure 10:
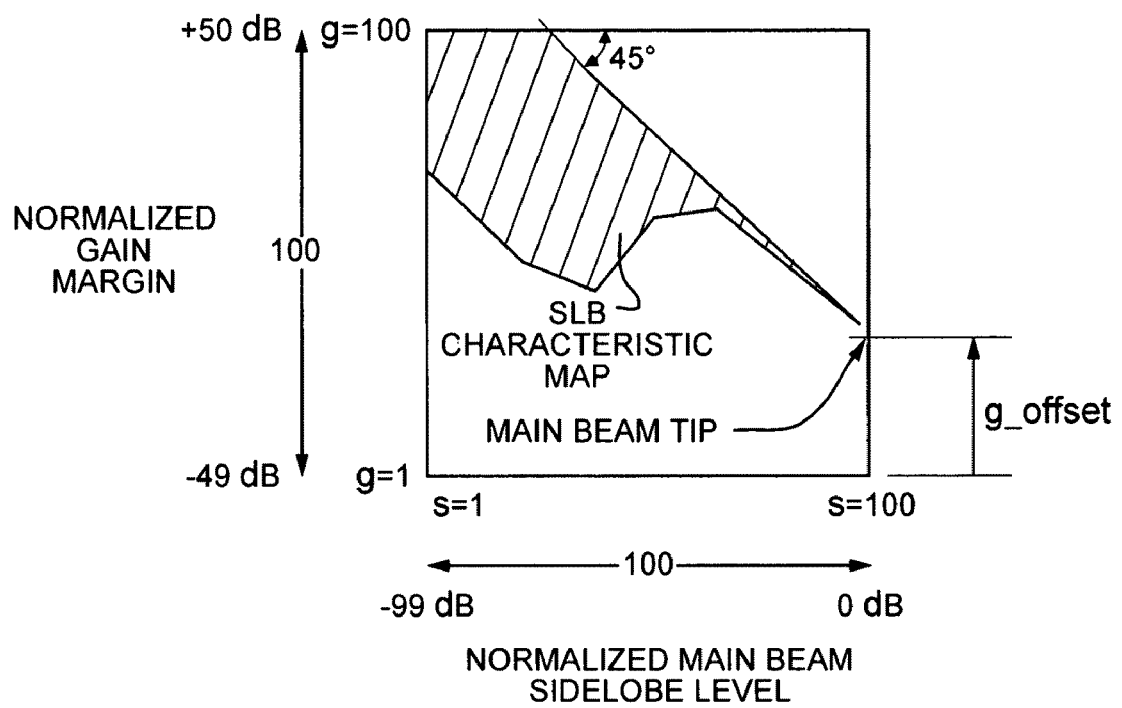
FIG. 10 illustrates in greater detail, the parts of the SLB Characteristic Map according to the teachings of the present invention.

Referring to FIG. 8 and FIG. 10, FIG. 10 illustrates the ranges of indices on the axes of the SLB Characteristic Map. After generating the SLB Characteristic Map, the characterizer process searches for the main beam tip in the Map as indicated in block 300 of FIG. 8. Since the main beam tip is always located at the right most edge of the Characteristic Map (i.e. index s=100), the search is conducted along the Gain Margin axis (index g) as indicated in FIG. 10. Next, the location of the main beam tip is marked as g_offset as indicated in FIG. 10.

For the threshold setting later in the process indicated in block 600 (FIG. 8), the Averaged Gain Margin (gm_ave) of the SLB Characteristic Map is computed as indicated in block 400. The computation is carried out in a straightforward manner, and it is the sum of all the Gain Margin values divided by the number of samples in the Characteristic Map. Before moving on to the next step, the next set of antenna patterns is processed by characterizer component 24 until all the Maps are generated.

Referring to FIGS. 8 and 9, the first aspect important to the understanding of the present invention is the SLB Characteristic Map. The details of block 200 in generating the SLB Characteristic Map will now be described with reference to the flowchart of FIG. 9. The process goes through each data point of the antenna patterns as indicated in block 210. Each data point is an angular location of the antenna patterns, which location unit could be expressed in sine space, degrees or radians. At each data point, the main beam pattern (mostly sidelobe) value in dB is quantized to the map index "s".

This index value has a range between 1 and 100 and is offset to cover the range from −99 dB to 0 dB. Assuming the main beam pattern and the auxiliary antenna pattern are angularly aligned, the Gain Margin at the same index value is computed as (aux−main) in dB as indicated in block 230. The Gain Margin is then quantized to index "g" in the range between 1 and 100 as indicated in block 240. The value "g" is offset to cover the range of −49 dB to +50 dB of Gain Margin. As indicated in block 250, the SLB Characteristic Map is constructed by counting the distribution of the Gain Margin (index g) versus the main beam sidelobe values (index s).

FIG. 10 also illustrates the ranges of the indices on the axes of the SLB Characteristic Map. It will be noted that since both axes have the same unit of 1 dB per division, the main beam always forms a straight line at an angle of 45 degrees.

Figure 11:
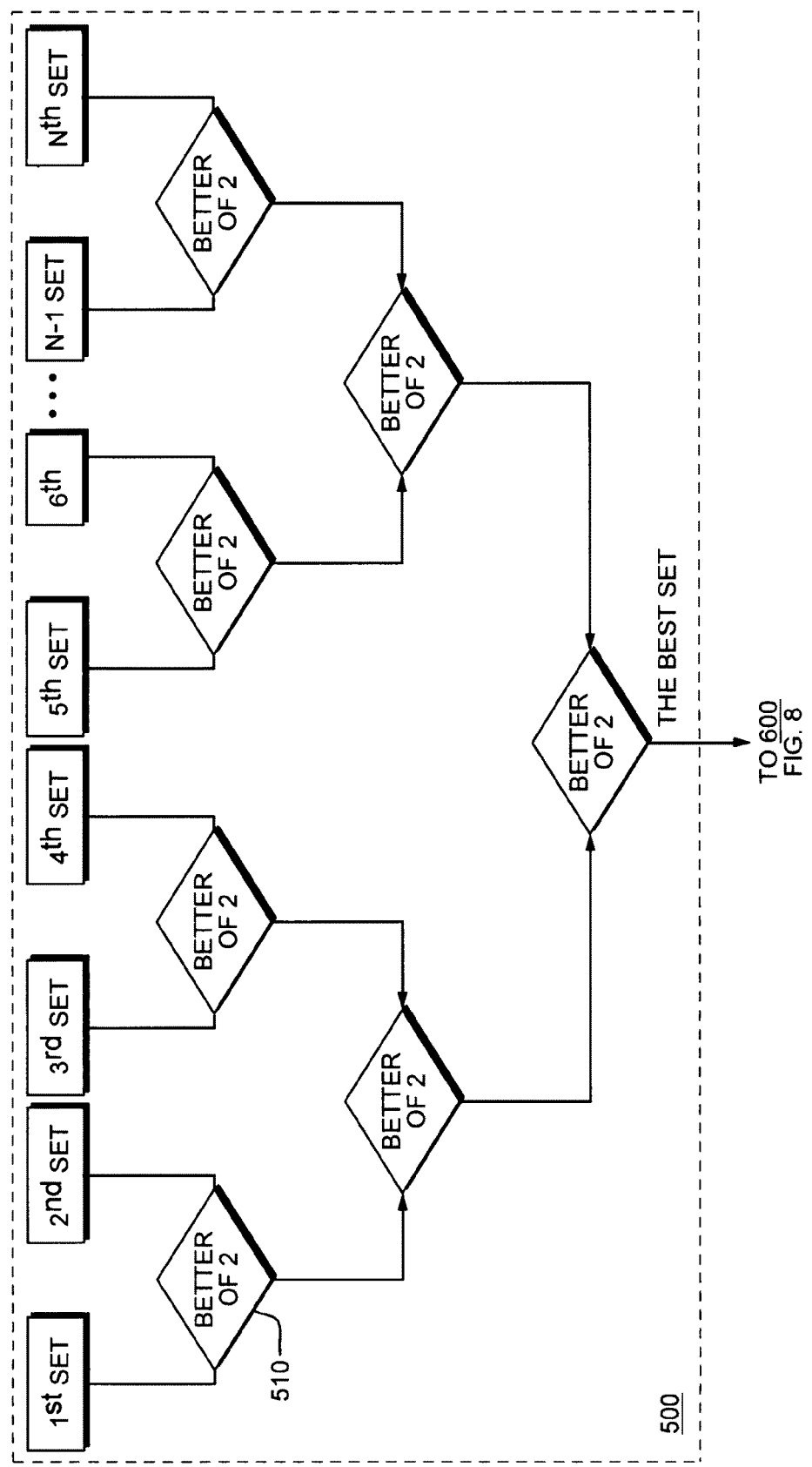

Referring to FIGS. 8 and 11, it is seen that once the SLB Characteristic Maps are generated by characterizer 24 component, the process then constructs in a well known manner, a comparison tree structure pursuant to block 500 of FIG. 8. The tree structure provides the storage mechanism for the intermediate results as well as the further comparison path between the intermediate results. When the traverse through the tree structure has reached the final node, the comparisons are complete. This tree structure is a tournament-like combination of every two SLB Characteristic Maps and is illustrated in FIG. 11. As indicated in FIG. 11, the decision tree provides for the selection of the best set of antenna patterns which corresponds to the output of block 500 in FIG. 8. Based on such selection, an index associated with that set of patterns is used to lookup or obtain the set of best weighting factors as indicated in block 1200 of FIG. 8. For example, an index can be used to identify a stored data structure containing a set of antenna patterns and its set of weighting factors for generating such set of antenna patterns. From such index, the corresponding set of weighting factors for the best set of antenna patterns can be obtained via a simple table lookup operation. Other conventional ways of relating a set of weighting factors to a particular set of antenna patterns can also be used.

As indicated in block 500, for each combination of two sets, or Characterizer Maps, the threshold T is selected as the minimum of the two averaged Gain Margins as indicated in block 600. The threshold T is used to generate the SLB Effectiveness Chart from the SLB Characteristic Map as indicated in block 700. Then the averaged value "A1" and total area "C1" of the SLB Effectiveness Chart are calculated as indicated in block 800. These two steps are repeated for the second Characteristic Map as indicated in blocks 900 and 1000. As indicated in block 1100, the characterizer 24 component finally selects one of the two sets of Characteristic Maps for further comparison with the next combination of Characteristic Maps based on the averaged values and the total areas.

Figure 12:
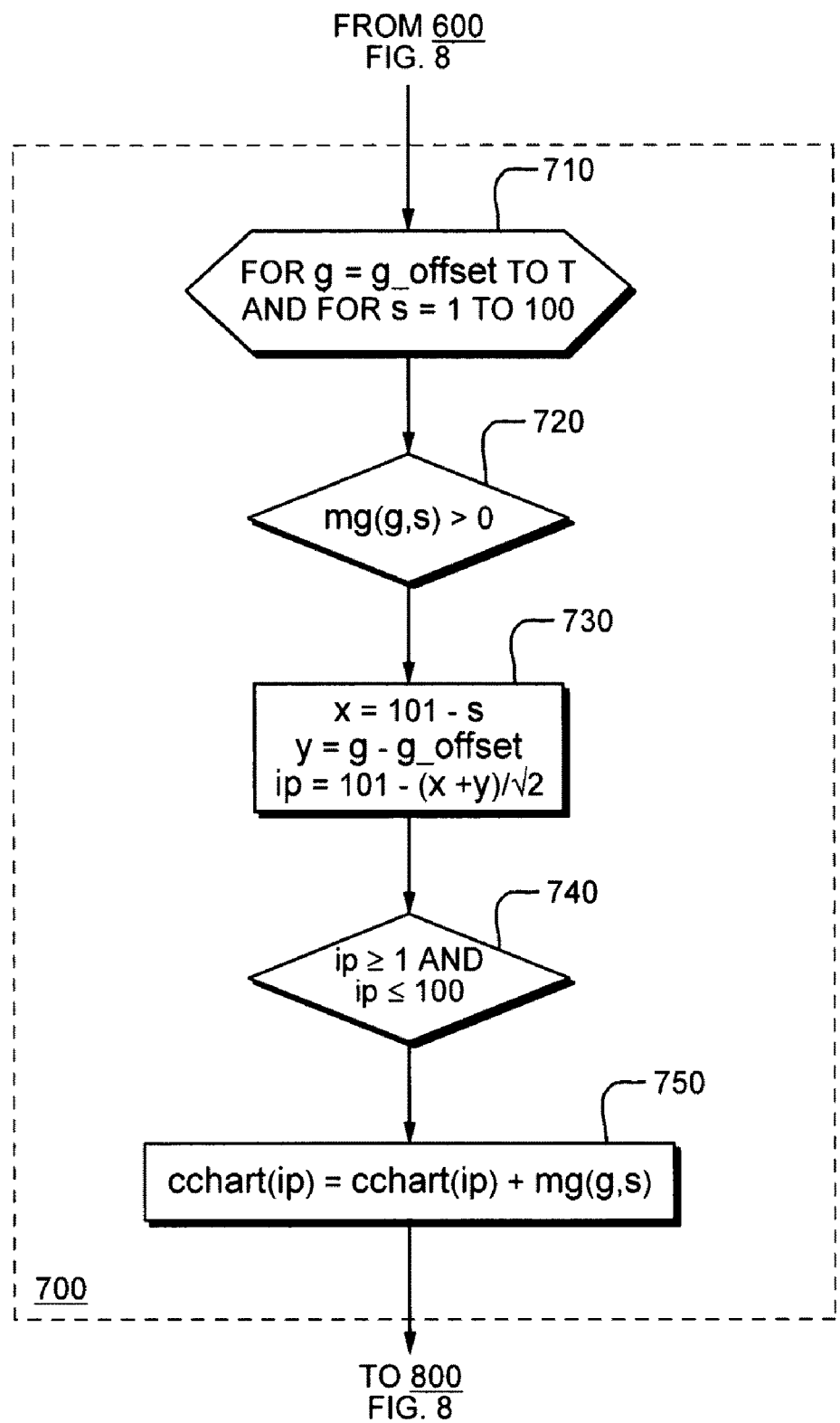
Figure 13:
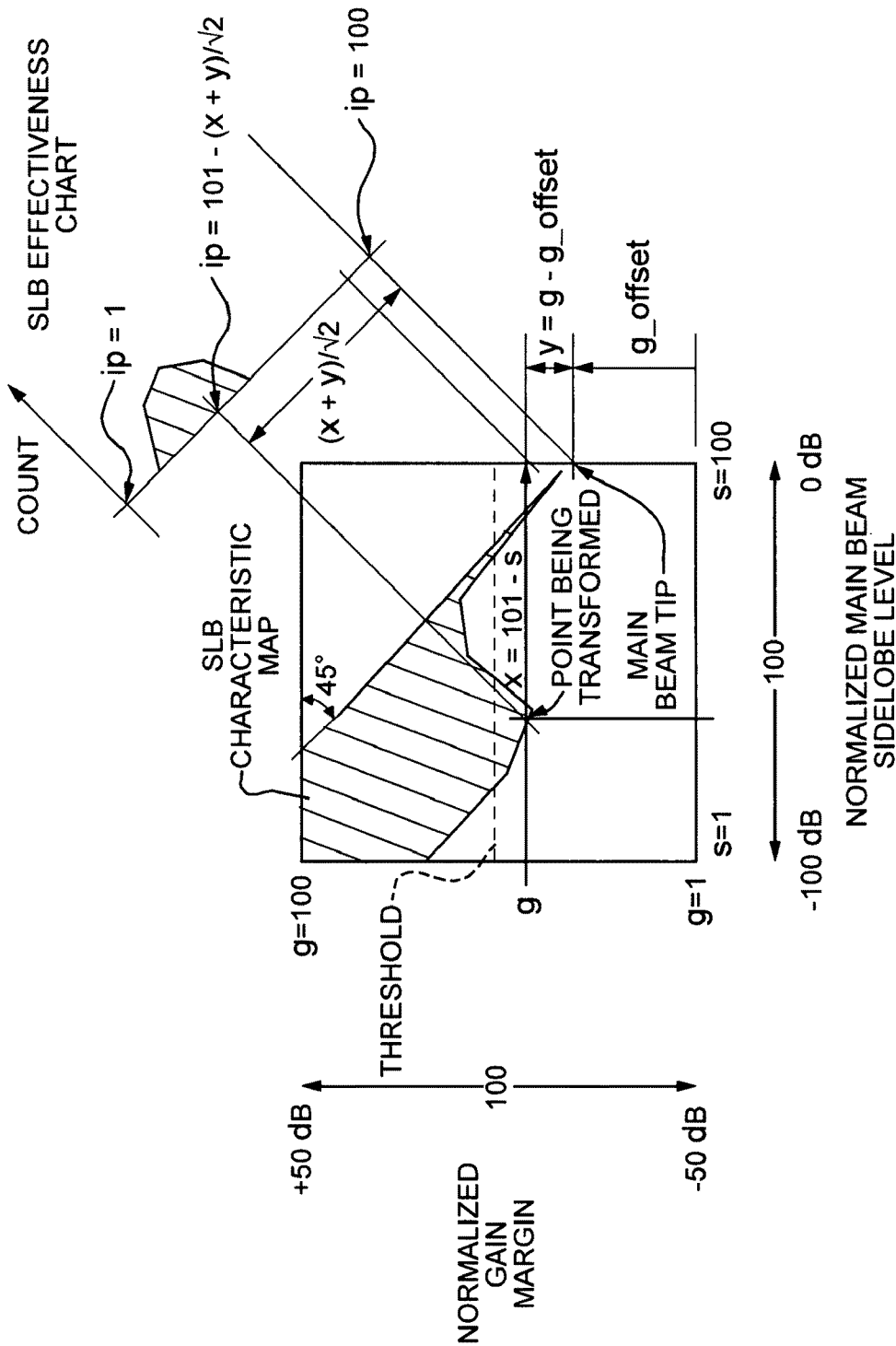
FIG. 13 illustrates the relationship between the SLB Characteristic Map and the SLB Effectiveness Chart according to the teachings of the present invention.

Referring to FIGS. 12 and 13, the second aspect important to the understanding of the present invention which is the generation of the SLB Effectiveness Chart will now be described. The details of generating this chart will now be described with reference to the flowcharts of FIGS. 12 and 13. FIG. 12 illustrates the process of generating the SLB Effectiveness Chart and FIG. 13 shows the relationship between the SLB Characteristic Map and the SLB Effectiveness Chart. The SLB Effectiveness Chart only considers the portion of the SLB Characteristic Map, where the Gain Margin is between the main beam tip (g_offset) and the threshold T. This is the weakest area having the lowest Gain Margin of the sidelobe blanking system. As indicated in block 710 of FIG. 12, for each index to this area, the process only considers the Characteristic Map value that is greater than zero as indicated in block 720. The index "ip" to the SLB Effectiveness Chart is computed in the manner indicated in block 730 according to the following equation:

$$ip = 101 - [(101-s) + (g - g\_offset)] \cdot \cos(45°).$$

This "ip" equation is based on the geometry of projecting the data to an axis parallel to the main beam. FIG. 13 shows an example of the relationship between the SLB Characteristic Map and the SLB Effectiveness Chart at a "Point being transformed" with the "ip" equation broken down into steps. As indicated in block 740, the next step is the boundary check of the index "ip" before carrying out the step of accumulating the Characteristic Map value to the Effectiveness Chart indicated in block 750.

Figure 14:
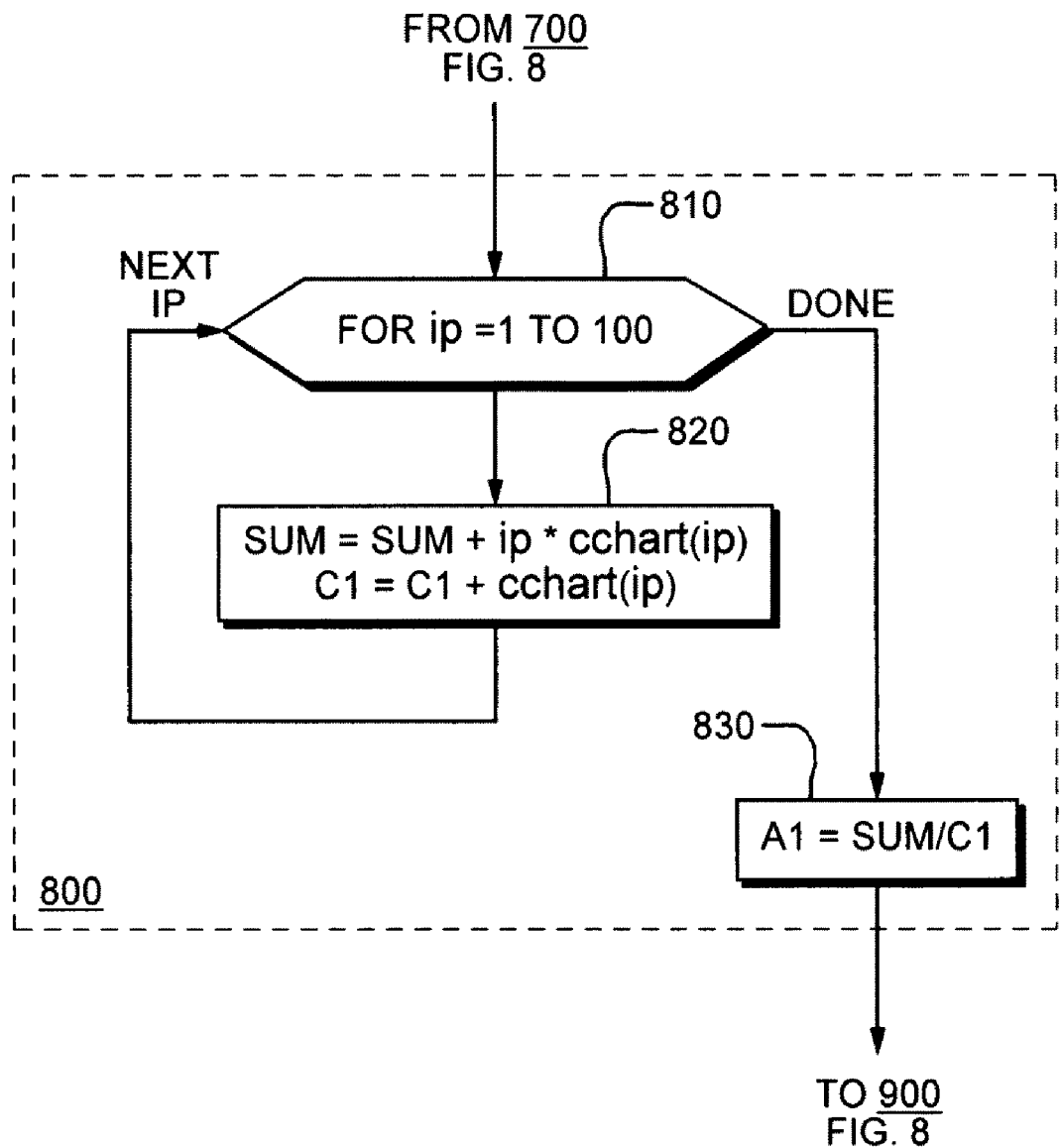

Referring to FIG. 14, this flow chart illustrates the process of computing the averaged value "A1" and the total area "C1" of the SLB Effectiveness Chart of block 800 of FIG. 8. The process goes through the Effectiveness Chart using index "ip" as indicated in block 810 of FIG. 14. For each indexed location, the chart value is accumulated as "the total area" and the product of index "ip" and the chart value is accumulated as "the sum" as indicated in block 820. At the end, the averaged value "A1" is calculated as "the sum" divided by the total area "C1" as indicated in block 830.

Figure 15:
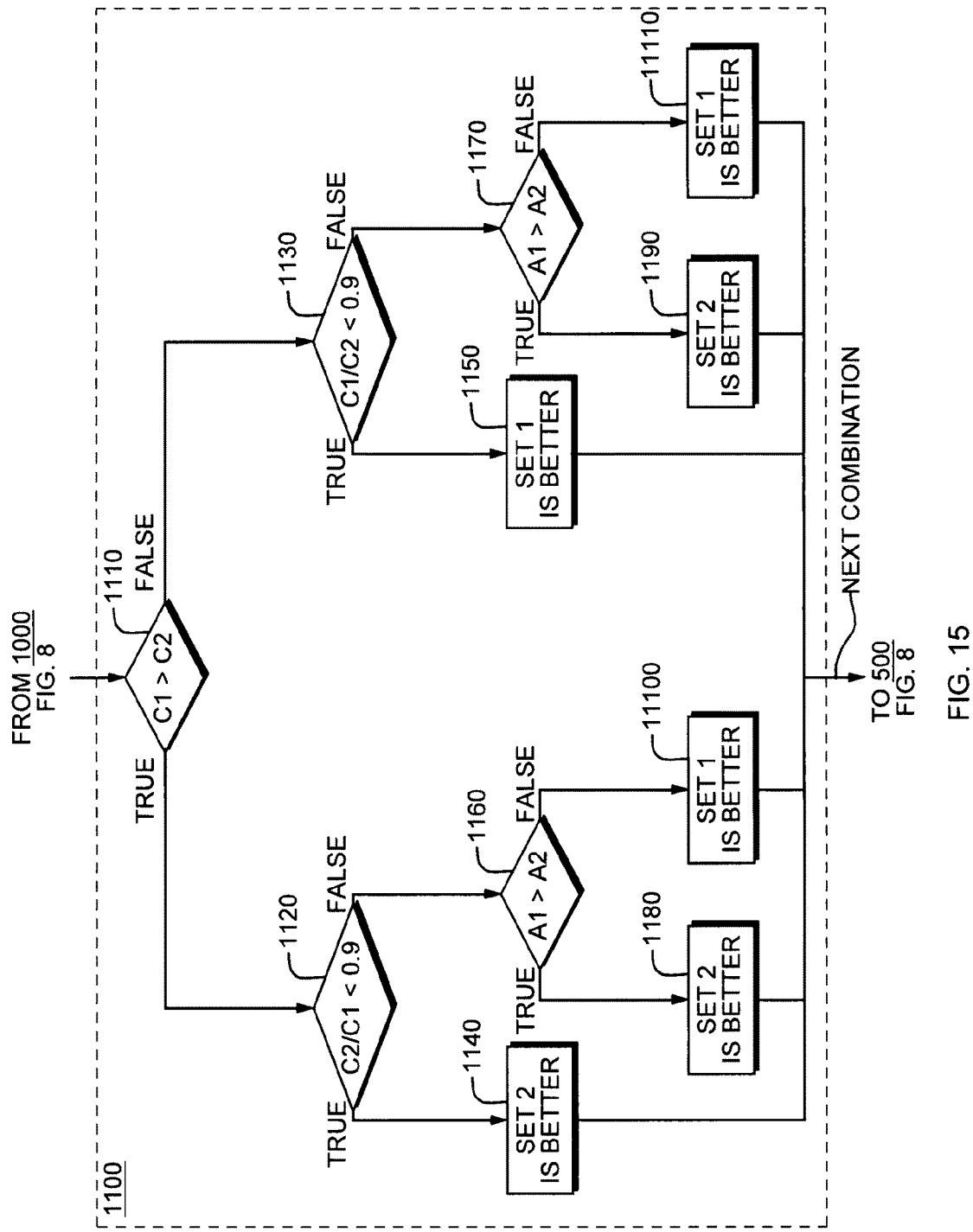

The flowchart of FIG. 15 illustrates the selection process according to the teachings of the present invention. Referring to FIG. 15, when the averaged values "A1", "A2" and the total areas "C1", "C2" of both sets have been calculated, the process then selects the better of the two sets based on these calculated values as indicated in block 1100 of FIG. 8. As indicated in block 1110 of FIG. 15, the first line of decision making is based on "the total area". The total area in the SLB Effectiveness Chart represents the probability of having poor Gain Margin. In other words, the higher the total area is, the worse the performance of the sidelobe blanking will be. When one of the total areas is much greater than the other (greater than 10% difference as established by blocks 1120 and 1130), the decision is obvious and selection is made via one of the sets of blocks 1120, 1140 and 1130, 1150 based on the result given by block 1110. When both total areas have similar values (less than 10% difference), the corresponding averaged values are then compared by blocks 1160 and 1170 based on the results produced by blocks 1120 and 1130. Based on the comparison, one of the blocks 1180, 11100, 1190 and 11110 indicates which set is better. The averaged value in the SLB Effectiveness Chart represents position of the poor Gain Margin values relative to the tip of the main beam. The higher the averaged value is, the closer it is to the main beam and the sidelobe blanking is less effective.

Figure 16A:
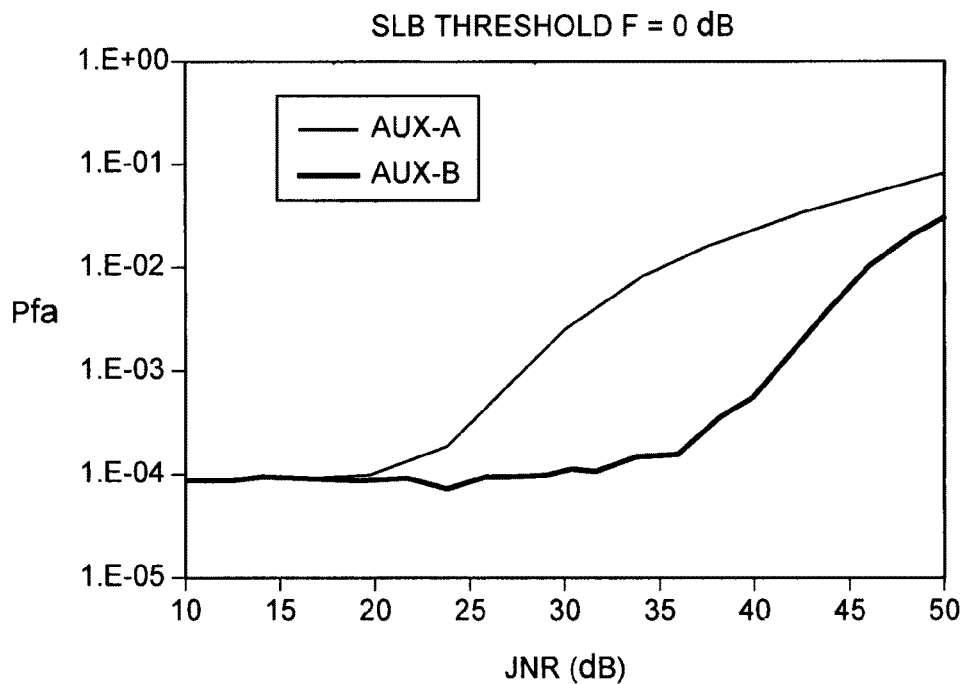
FIG. 16A and FIG. 16B illustrate Probability of Detection and Probability of False Alarm charts used in verifying the decision of the characterizer component of FIG. 2.
Figure 16B:
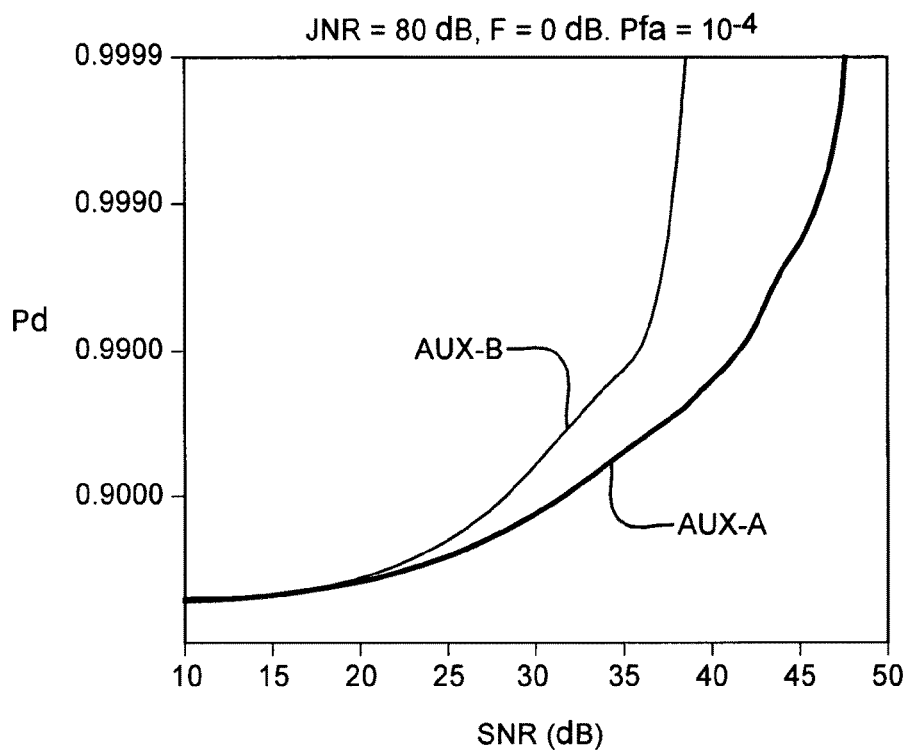

Referring to FIG. 16A and FIG. 16B, a verification of the results obtained by the present invention is illustrated through the use of the parameters Probabilities of False Alarm (Pfa) and Probabilities of Detection (Pd). As shown, the selected best set of patterns corresponds to the AUX-B which is less susceptible to interference from sidelobes and has a higher Pd under the same conditions.

The operation of the SLB Character 24 component of the present invention within the radar system of FIG. 1 will now be described with reference to FIG. 18. The circles in FIG. 18 are used to denote processes and the lines/arrows are used to represent signal/data transfers taking place between such processes.

Figure 18:
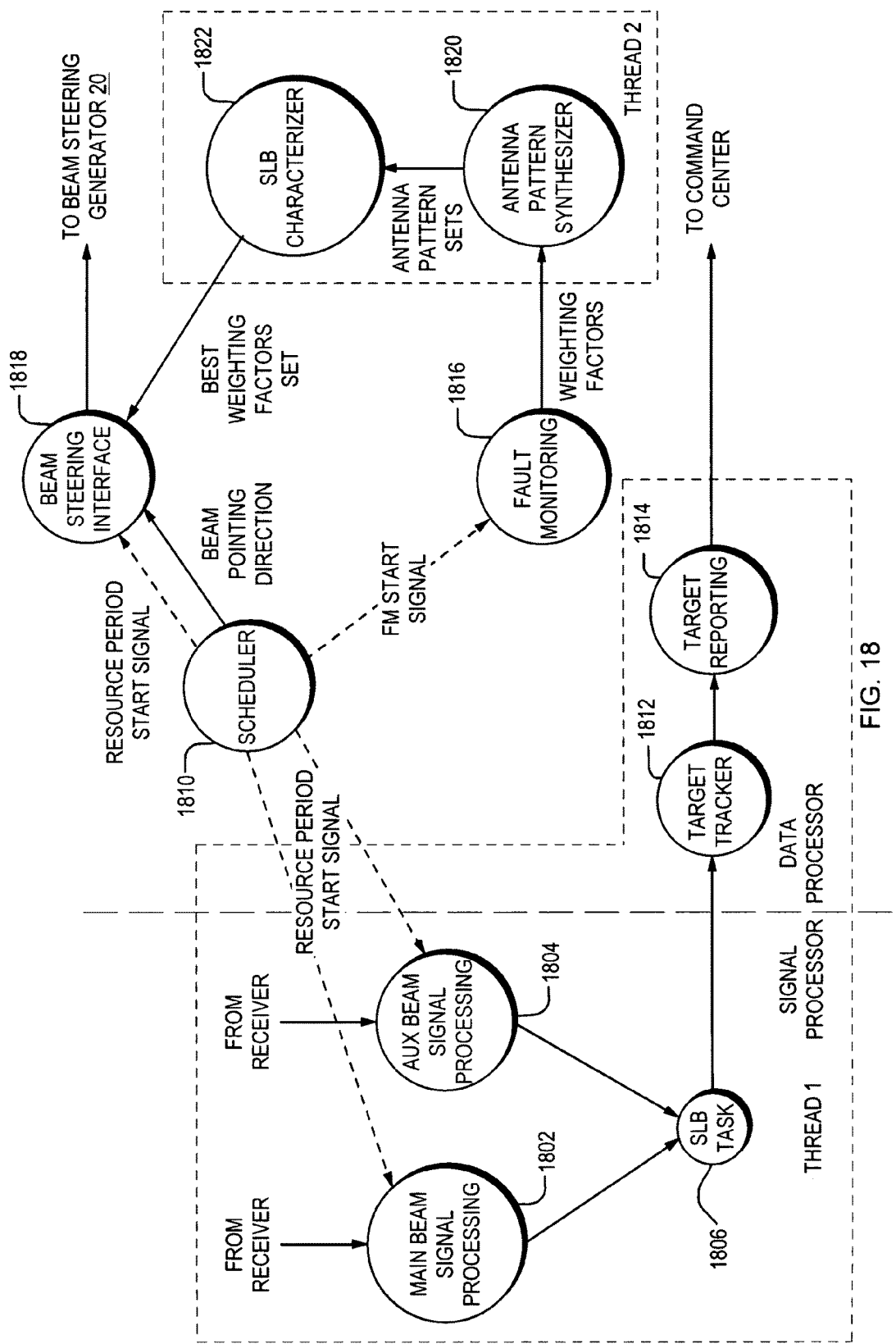
FIG. 18 is a simplified diagram used to describe the processes which the radar data processor of FIG. 1 executes in conjunction with the operation of the characterizer component of FIG. 2.

It will be appreciated that there are multiple threads of processes being executed by the signal processors 12-6, 14-6 and the radar data processor 16 of FIG. 1 which are shown as being divided by the dashed vertical line in FIG. 18. The first thread (Thread 1) includes processes/functions 1802, 1804, 1806, 1812 and 1814. This thread is executed normally at a fast pace or rate and its execution is repeated for as long as the radar system 10 is operating (i.e. executing transmit and receive cycles of operation). The second thread (Thread 2) includes processes 1820 and 1822. This thread executes or runs in the background and is activated whenever there is a change in system operational status such as a change in platform motion or antenna element failure. The execution of the second thread results in providing the radar system with a new best set of weighting factors in accordance with the teachings of the present invention as described herein. The other processes 1810, 1818 and 1816 are executed at different paces or rates and may belong to other threads that are not shown in this simplified diagram.

In greater detail, as shown, two of the processes of the first thread corresponding to main beam signal processing 1802 and auxiliary beam signal processing 1804 receive signals corresponding to the main beam and auxiliary beam patterns respectively from the main and auxiliary channels 12 and 14 of FIG. 1. Both processes are invoked to start a next transmit and receive cycle of operation in response to a resource period start signal generated by a scheduler process 1810. The scheduler process 1810 also applies a similar start signal to a beam steering interface process 1818. The interface process 1818 controls the operation of the beam steering generator 20 of FIG. 1. More specifically, it prepares the beam steering generator 20 for the next transmit and receive cycle by providing a new set of weighting factors corresponding to the best of weighting factors in addition to providing a beam pointing direction signal as indicated in FIG. 18. This is done when there has been a change in conditions (e.g. platform motion or antenna element failure) as described herein.

The data signals from processing the main and auxiliary antenna patterns are applied to a sidelobe blanking task process 1806 which in turn provides the blanking of interference signals according to the parameters pre-established by the SLB circuit of FIG. 1. As shown in FIG. 18, the resulting output signal from the SLB task process 1806 is then applied to the processes 1812 and 1814 for performing the functions of target tracking and target reporting in a conventional manner. The output signal from the target reporting process 1814 is then sent to a command center (not shown) associated with the radar system of FIG. 1.

As shown in FIG. 18, the scheduler process 1810 also sends a fault monitoring (FM) start signal to invoke a fault monitoring process 1816 at a regular interval of a much slower pace. When the fault monitoring process 1816 discovers change to the system, it generates different sets of weighting factors which can be used to compensate for the condition change. An example of this was described in connection with FIG. 17. As indicated in FIG. 18, the different sets of weighting factors are applied to an antenna pattern synthesizer process 1820 which in turn generates the corresponding sets of antenna patterns. These sets of antenna patterns are applied to a SLB characterizer process 1822 which corresponds to the SLB characterizer 24 component of FIG. 1. The SLB characterizer process 1822 determines the best set of weighting factors in accordance with the teachings of the present invention in the manner described above. As shown in FIG. 18, this best set of factors is provided to the beam steering interface process 1818 for adapting radar system SLB circuit performance to the detected change in conditions.

The operation of the SLB Characterizer 24 component of the present invention was simulated using a simulation testbed tool. The tool was implemented on a standard microprocessor system running under a Window based operating system. The testbed tool (simulation model) was developed using the matrix-based Matlab programming language. This language was selected because of its built-in graphics capability and the inherent programming structure that can later be converted to the C programming language or a simulation language for compilation and faster execution as well as its portability. The listing of the testbed tool is provided in the enclosed Appendix.

It will be appreciated that the simulation testbed can be used for determining which antenna design has the best SLB performance utilizing the characterizer component according to the teachings of the present invention. In this application, the sources of main and auxiliary antenna patterns would correspond to the sets of patterns obtained from different antenna designs. Thus, it is obvious that the Appendix essentially represents a MATLAB implementation of such a test tool.

From the above description of the illustrated embodiment, it is seen how the use of a SLB characteristic map provides a relatively less complex method of evaluating antenna designs independent of other system parameters such as detection threshold, signal to noise ratio and system configuration discussed above.

Also, the above description has also shown how the generation and comparison of SLB effectiveness charts in accordance with the teachings of the present invention makes antenna selection much less complex by taking into account, main beam sidelobe distribution which is in contrast to the described prior art approach of using cumulative percentage of gain margin. That is, the SLB characterizer component uses the SLB effectiveness charts to select the set of best antenna weighting factors and provides the ability for a radar system to adapt to antenna component failures and ship motion.

This invention has been disclosed in terms of an illustrated embodiment. However, it will be apparent that many modifications can be made to the disclosed apparatus without departing from the invention. For example, the modules of the characterizer component could be implemented using well known hardware components such as programmable logic arrays etc. Therefore, it is the intent of the appended claims to cover all such variations and modifications as come within the true spirit and scope of this invention.

APPENDIX

Matlab Simulation of Illustrated Embodiment

The following notations used herein have the following equivalent designations used in the description and drawings of the illustrated embodiment:

1st AUX Beam=AUX-A; 2nd AUX Beam=AUX-B; GM Map=SLB Characteristic Map; and Punch-through chart=SLB Effectiveness Chart.

---

```
GMapDemo listing
% demostration of the SLB Characterister
% The files to be used can be the following:
% main3.txt, aux__s2555.txt, aux__n2548.txt
% main3.txt, aux__s2052.txt, aux__n3555.txt
% or the default set
close all;
clear all;
% open Main Beam file to read. Expected format as 402 columns by 401 rows
ifilename = input('Main Beam file name: ', 's');
if isempty(ifilename)
    ifilename = 'mainXX.txt';
end
fid = fopen(ifilename);
% first column is angle values
mainbeam = fscanf(fid, '%f', [502 501]);
fclose(fid);
% open 1st AUX Beam file to read. Expected format as 402 columns by 401 rows
ifilenameA1 = input('1st AUX Beam file name: ', 's');
if isempty(ifilenameA1)
    ifilenameA1 = 'auxAXX.txt';
end
```

-continued

```
fid = fopen(ifilenameA1);
aux1beam = fscanf(fid, '%f', [502 501]);
fclose(fid);
% open 2nd AUX Beam file to read. Expected format as 402 columns by
401 rows
ifilenameA2 = input('2nd AUX Beam file name: ', 's');
if isempty(ifilenameA2)
    ifilenameA2 = 'auxBXX.txt';
end
fid = fopen(ifilenameA2);
aux2beam = fscanf(fid, '%f', [502 501]);
fclose(fid);
% generate GM map 1
GMmap1 = zeros(100,100);
cumper1 = zeros(100,1);
for i = 2:501
    for j = 1:501
        iside = round(100 + mainbeam(i, j));
        igain = round(50 + (aux1beam(i, j) – mainbeam(i, j)));
        if (iside < 1)
            iside = 1;
        elseif (iside > 100)
            iside = 100;
        end
        if (igain < 1)
            igain = 1;
        elseif (igain > 100)
            igain = 100;
        end
        GMmap1(igain, iside) = GMmap1(igain, iside) + 1;
        cumper1(igain) = cumper1(igain) + 1;
    end
end
% generate GM map 2
GMmap2 = zeros(100,100);
cumper2 = zeros(100,1);
for i = 2:501
    for j = 1:501
        iside = round(100 + mainbeam(i, j));
        igain = round(50 + (aux2beam(i, j) – mainbeam(i, j)));
        if (iside < 1)
            iside = 1;
        elseif (iside > 100)
            iside = 100;
        end
        if (igain < 1)
            igain = 1;
        elseif (igain > 100)
            igain = 100;
        end
        GMmap2(igain, iside) = GMmap2(igain, iside) + 1;
        cumper2(igain) = cumper2(igain) + 1;
    end
end
% calculate cumulative percentage
totalc1 = sum(cumper1);
cumper1 = cumper1 / totalc1;
cp1 = ones(100,1);
totalc2 = sum(cumper2);
cumper2 = cumper2 / totalc2;
cp2 = ones(100,1);
for i=2:100
    cp1(i) = cp1(i−1) − cumper1(i);
    cp2(i) = cp2(i−1) − cumper2(i);
end
% display cumulative percentage of Gain Margin
figure1 = figure(1);
axes1 = axes(...
    'XGrid','on',...
    'YGrid','on',...
    'Parent',figure1);
axis(axes1,[0 100 0 100]);
xlabel(axes1,'Gain Margin');
ylabel(axes1,'cumulative percentage');
box(axes1,'on');
hold(axes1,'all');
plot(cp1*100, 'b')
hold on
plot(cp2*100, 'r')
legend(axes1,{ifilenameA1,ifilenameA2},'Location','Best');
set(gca, 'XTickLabel', {'−49','−40','−30','−20',
'−10','0','10','20','30','40','50'})
% find the main lobe location in the map
yoffset1 = 0;
yoffset2 = 0;
j = 100;
while (((yoffset1 == 0) || (yoffset2 == 0)) && (j > 1))
    for i=1:100
        if (GMmap1(i, j) > 0)
            yoffset1 = i;
        end
        if (GMmap2(i, j) > 0)
            yoffset2 = i;
        end
    end
    j = j − 1;
end
% translate Gain Margin to punch-through chart
pt1 = zeros(100,1);
pt2 = zeros(100,1);
for i=1:50 % only consider punch-through
    for j=1:100
        x = 101 − j;
        ip1 = 101 − round((x + i − yoffset1) / 2);
        ip2 = 101 − round((x + i − yoffset2) / 2);
        if ((ip1 >= 1) && (ip1 <= 100))
            pt1(ip1) = pt1(ip1) + GMmap1(i, j);
        end
        if ((ip2 >= 1) && (ip2 <= 100))
            pt2(ip2) = pt2(ip2) + GMmap2(i, j);
        end
    end
end
% calculate the average/center of the graph
sum_ip1 = 0;
sum_ip2 = 0;
n_ip1 = 0;
n_ip2 = 0;
for i=1:100
    sum_ip1 = sum_ip1 + i * pt1(i);
    sum_ip2 = sum_ip2 + i * pt2(i);
    n_ip1 = n_ip1 + pt1(i);
    n_ip2 = n_ip2 + pt2(i);
end
ave_ip1 = 0;
ave_ip2 = 0;
if (n_ip1 > 0)
    ave_ip1 = sum_ip1 / n_ip1;
end
if (n_ip2 > 0)
    ave_ip2 = sum_ip2 / n_ip2;
end
% prepare the punch-through charts
figure2 = figure(2);
axes2 = axes(...
    'XGrid','on',...
    'XTickLabel',{'−100','−90','−80','−70','−60','−50','−40','−30',
'−20','−10','0'},...
    'YGrid','on',...
    'Parent',figure2);
xlim(axes2,[0 100]);
xlabel(axes2,'Sidelobe level (dB)');
ylabel(axes2,'Counts');
box(axes2,'on');
hold(axes2,'all');
% determine which is better
if (n_ip1 > n_ip2) % file A1 has more punch-through than A2
    if ((n_ip2 / n_ip1) < 0.9) % the difference is more than 10%
        title2 = sprintf('%s is the better of the two\n', ifilenameA2);
    else % the difference is less than 10%
        if (ave_ip1 > ave_ip2) % file A1 ave punch-through is at high sidelobe
            title2 = sprintf('%s is the better of the two\n', ifilenameA2);
        else
            title2 = sprintf('%s is the better of the two\n', ifilenameA1);
```

```
                    -continued end
  end
else % (n__ip2 > n__ip1) file A2 has more punch-through than A1
  if ((n__ip1 / n__ip2) < 0.9) % the difference is more than 10%
    title2 = sprintf('%s is the better of the two\n',
ifilenameA1);
  else % the difference is less than 10%
    if (ave__ip1 > ave__ip2) % file A1 ave punch-through is at
high sidelobe
      title2 = sprintf('%s is the better of the two\n',
ifilenameA2);
    else
      title2 = sprintf('%s is the better of the two\n',
ifilenameA1);
    end
  end
end
title(axes2, title2);
%title(axes2, title2);
plot(pt1, 'b')
hold on
plot(pt2, 'r')
legend2 = legend(axes2,{ifilenameA1,ifilenameA2},'Location','Best'
```

What is claimed is:

1. A method for providing effective adaptive sidelobe blanking for use in a platform mounted phase array radar system for detecting targets when interference occurs, the radar system including a main antenna channel and at least one auxiliary antenna channel for transmitting and receiving a main beam and sidelobe patterns from a main antenna and receiving an auxiliary antenna pattern from at least one auxiliary antenna, the main and auxiliary channel being coupled to a sidelobe blanking (SLB) circuit for blanking out interference and whose output couples to a radar data processor included in the system for processing the antenna patterns and producing data patterns and weighting factor sets and beam pointing direction signals and a beam steering generator coupled to the radar data processor for receiving the beam pointing direction signals, the method comprising:

(a) including in the system, a characterizer component coupled to the radar data processor and to beam steering generator for providing sets of best weighting factors information as a function of main beam sidelobe distribution as inputs to the beam steering generator for generating antenna pattern sets for use by the system;

(b) the characterizer component generating a SLB characteristic map for each set of antenna patterns received from the radar processor;

(c) the characterizer component generating a SLB effectiveness chart from the SLB characteristic map;

(d) the characterizer component selecting a best antenna weighting set based on which auxiliary antenna pattern exhibits the best performance; and, (e) the characterizer component applying the best weighting factors selected in step (d) as an updated input to the beam steering generator for generating the best antenna pattern set to provide an adaptive SLB capability in conjunction with the operation of the SLB circuit.

2. The method of claim 1 wherein step (c) further includes the step of using an oblique projection technique for generating the sidelobe blanking effectiveness chart.

3. The method of claim 1 wherein step (d) further includes the steps of:

(1) overlaying the SLB effectiveness charts on the same axis; and, (2) choosing the set with a distribution at the sidelobe which is the lowest corresponding to the antenna pattern having the best performance.

4. The method of claim 1 wherein the method further includes the step of:

(f) establishing a threshold value T corresponding to a minimum of two averaged gain margins of each combination of two sets of antenna patterns, the step being used in step (c) to generate the SLB effectiveness chart.

5. The method of claim 1 wherein in step (b), the characteristic map is constructed by computing the sum of all gain margin values divided by the number of samples in the characteristic map.

6. The method of claim 5 wherein step (b) further includes the steps of:

(1) examining each point of the set of antenna patterns and quantizing the main beam pattern value in to a map index "s";

(2) computing the gain margin of the angularly aligned main beam and auxiliary antenna patterns of the set and quantizing the computed gain margin value to an index "g"; and, (3) constructing the SLB characteristic map by counting the distribution of the gain margin index g values versus the main beam sidelobe index s values.

7. The method of claim 4 wherein step (c) further includes the steps of:

(1) selecting an area of the SLB characteristic map where the gain margin is between the main beam tip (g_offset) and the threshold T which is the weakest area corresponding to that having the lowest gain margin produced by the SLB circuit;

(2) calculating an index value (ip) according to the following equation based on the geometry of projecting points of data to an axis parallel to the main beam:

$$ip = 101 - [(101 - s) + (g - g\_\text{offset})] \cdot os(45°);$$

(3) computing averaged and total area values A and C for each two sets SLB effectiveness charts using the index value (ip); and, (4) selecting the better of the two sets based on examining corresponding values of A and C in a predetermined manner.

8. The method of claim 7 wherein in step (c) (4) comprises the steps of:

(1) first determining when the total areas differ by less than a preestablished value;

(2) when the result of step (c) (4)(1) indicates that the total area values do not differ by the pre-established value, select the better of the two sets based on which of the averaged values for the two sets has the lower value based on being further away from the main beam and indicative of better SLB circuit performance.

9. The method of claim 7 wherein step (c)(3) further includes the steps of:

(1) constructing comparison tree paths based on the results obtained in step (c)(3) until all sets of main and auxiliary antenna patterns have been processed.

10. The method of claim 7 wherein step (c)(3) further includes the step of:

(1) comparing the total area values and when the total area values differ by a pre-established amount, selecting the better of the two sets based on which one of the total area values has the lower value indicative of better SLB circuit performance.

11. A method for evaluating different antenna designs relative to determining which design provides superior sidelobe blanking (SLB) characteristics for operation within a platform mounted phase array radar system for detecting targets when interference occurs, the method comprising:

(a) receiving different sets of antenna patterns representative of the different antenna designs from a corresponding number of data sources;

(b) applying the different sets of antenna patterns received in step (a) to a characterizer component for generating a SLB characteristic map for each set of antenna patterns received;

(c) generating a SLB effectiveness chart from the SLB characteristic map;

(d) selecting a best antenna weighting set based on which auxiliary antenna pattern exhibits the best performance; and, (e) using the selected best of antenna weighting factors for designating the antenna design having superior SLB performance characteristics.

12. The method of claim 11 wherein step (c) further includes the step of using an oblique projection technique for generating the sidelobe blanking effectiveness chart.

13. The method of claim 11 wherein step (d) further includes the steps of:

(1) overlaying the SLB effectiveness charts on the same axis; and, (2) choosing the set with a distribution at the sidelobe which is the lowest corresponding to the antenna pattern having the best performance.

14. The method of claim 11 wherein the method further includes the step of:

(f) establishing a threshold value T corresponding to a minimum of two averaged gain margins of each combination of two sets of antenna patterns, the step being used in step (c) to generate the SLB effectiveness chart.

15. The method of claim 11 wherein in step (b), the characteristic map is constructed by computing the sum of all gain margin values divided by the number of samples in the characteristic map.

16. The method of claim 15 wherein step (b) further includes the steps of:

(1) examining each point of the set of antenna patterns and quantizing the main beam pattern value in dB to a map index "S";

(2) computing the gain margin of the angularly aligned main beam and auxiliary antenna patterns of the set and quantizing the computed gain margin value to an index "g"; and, (3) constructing the SLB characteristic map by counting the distribution of the gain margin index g values versus the main beam sidelobe index s values.

17. The method of claim 14 wherein step (c) further includes the steps of:

(1) selecting an area of the SLB characteristic map where the gain margin is between the main beam tip (g_offset) and the threshold T which is the weakest area corresponding to that having the lowest gain margin produced by the SLB circuit;

(2) calculating an index value (ip) according to the following equation based on the geometry of projecting points of data to an axis parallel to the main beam:

$$ip = 101 - [(101-s) + (g - g\_\text{offset})] \cdot \text{Cos}(45°);$$

(3) computing averaged and total area values A and C for each two sets SLB effectiveness charts using the index value (ip); and, (4) selecting the better of the two sets based on examining corresponding values of A and C in a predetermined manner.

18. The method of 17 wherein step (c) (4) comprises the steps of:

(1) first determining when the total areas differ by less than a preestablished value;

(2) when the result of step (c) (4)(1) indicates that the total area values do not differ by the pre-established value, select the better of the two sets based on which of the averaged values for the two sets has the lower value based on being further away from the main beam and indicative of better SLB circuit performance.

19. The method of claim 17 wherein step (c)(3) further includes the steps of:

(1) constructing comparison tree paths based on the results obtained in step (c)(3) until all sets of main and auxiliary antenna patterns have been processed.

20. The method of claim 17 wherein step (c)(3) further includes the step of:

(1) comparing the total area values and when the total area values differ by a pre-established amount, selecting the better of the two sets based on which one of the total area values has the lower value indicative of better SLB circuit performance.

21. A characterizer component for providing effective adaptive sidelobe blanking for use in a platform mounted phase array radar system for detecting targets when interference occurs, the radar system including a main antenna channel and at least one auxiliary antenna channel for transmitting and receiving a main beam and sidelobe patterns from a main antenna and receiving an auxiliary antenna pattern from at least one auxiliary antenna, the main and auxiliary channel being coupled to a sidelobe blanking (SLB) circuit for blanking out interference and whose output couples to a radar data processor included in the system for processing the antenna patterns and producing data patterns and weighting factor sets and beam pointing direction signals, and a beam steering generator coupled to the radar data processor for receiving the beam pointing direction signals, the characterizer component being coupled to the radar data processor and to beam steering generator and comprising:

(a) a first module for generating a SLB characteristic map for each set of antenna patterns received from the radar processor;

(b) a second module for generating a SLB effectiveness chart from the SLB characteristic map received from the first module;

(c) a third module for selecting a best antenna weighting set based on which auxiliary antenna pattern exhibits the best performance; and, (d) a fourth module for applying the best weighting factors selected by the third module as an updated input to the beam steering generator for generating the best antenna pattern set to provide an adaptive SLB capability in conjunction with the operation of the SLB circuit.

* * * * *